US010781311B2

(12) United States Patent
Rodgers et al.

(10) Patent No.: US 10,781,311 B2
(45) Date of Patent: Sep. 22, 2020

(54) SEMI-CRYSTALLINE BUILD MATERIALS

(71) Applicant: Stratasys, Inc., Eden Prairie, MN (US)

(72) Inventors: Luke M. B. Rodgers, Chaska, MN (US); Vittorio L. Jaker, New Brighton, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 16/208,105

(22) Filed: Dec. 3, 2018

(65) Prior Publication Data

US 2019/0106569 A1 Apr. 11, 2019

Related U.S. Application Data

(63) Continuation of application No. 14/723,336, filed on May 27, 2015, now Pat. No. 10,144,828, which is a continuation-in-part of application No. 14/532,465, filed on Nov. 4, 2014, now Pat. No. 9,527,242, said application No. 14/723,336 is a continuation of application No. 14/077,703, filed on Nov. 12, 2013, now Pat. No. 9,744,722, which is a continuation-in-part of application No. 13/833,526, filed on Mar. 15, 2013, now Pat. No. 9,592,530.

(60) Provisional application No. 61/909,611, filed on Nov. 27, 2013, provisional application No. 61/729,043, filed on Nov. 21, 2012.

(51) Int. Cl.
| | |
|---|---|
| C08L 77/06 | (2006.01) |
| C08L 61/16 | (2006.01) |
| C08L 67/03 | (2006.01) |
| B29C 64/106 | (2017.01) |
| B33Y 70/00 | (2020.01) |
| B29K 105/00 | (2006.01) |
| B29C 71/00 | (2006.01) |
| B29K 71/00 | (2006.01) |
| B29K 79/00 | (2006.01) |
| B29C 71/02 | (2006.01) |
| B33Y 10/00 | (2015.01) |

(52) U.S. Cl.
CPC ............ C08L 77/06 (2013.01); B29C 64/106 (2017.08); C08L 61/16 (2013.01); C08L 67/03 (2013.01); *B29C 71/0063* (2013.01); *B29C 2071/022* (2013.01); *B29K 2071/00* (2013.01); *B29K 2079/085* (2013.01); *B29K 2105/0002* (2013.01); *B29K 2995/004* (2013.01); *B33Y 10/00* (2014.12); *B33Y 70/00* (2014.12)

(58) Field of Classification Search
CPC ........ B29C 64/106; C08L 61/16; C08L 67/03; C08L 77/06
See application file for complete search history.

(56) References Cited

U.S. PATENT DOCUMENTS

| | | |
|---|---|---|
| 3,925,307 A | 12/1975 | Dahl et al. |
| 4,609,714 A | 9/1986 | Harris et al. |
| 4,863,538 A | 9/1989 | Deckard |
| 5,132,143 A | 7/1992 | Deckard |
| 5,503,785 A | 8/1996 | Crump et al. |
| 5,866,058 A | 2/1999 | Batchelder et al. |
| 6,004,124 A | 12/1999 | Swanson et al. |
| 6,160,080 A | 12/2000 | Cucinella et al. |
| 6,869,559 B2 | 3/2005 | Hopkins |
| 6,923,634 B2 | 8/2005 | Swanson et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,879,282 B2 | 2/2011 | Hopkinson et al. |
| 7,896,209 B2 | 3/2011 | Batchelder et al. |
| 7,910,041 B1 | 3/2011 | Priedeman, Jr. et al. |
| 8,153,182 B2 | 4/2012 | Comb et al. |
| 2002/0111707 A1 | 8/2002 | Li et al. |
| 2002/0195739 A1 | 12/2002 | Bagley et al. |
| 2006/0134419 A1 | 6/2006 | Monsheimer et al. |
| 2007/0027167 A1 | 2/2007 | Donato et al. |
| 2007/0123092 A1 | 5/2007 | Legrand |
| 2009/0295042 A1 | 12/2009 | Pfister et al. |
| 2010/0010169 A1 | 1/2010 | Tsai et al. |
| 2011/0023986 A1 | 2/2011 | Hoffman et al. |
| 2011/0161056 A1 | 6/2011 | Mueller |
| 2011/0233804 A1 | 9/2011 | Batchelder et al. |
| 2011/0236683 A1 | 9/2011 | Takebe et al. |
| 2011/0256406 A1 | 10/2011 | Farrell et al. |
| 2012/0070619 A1 | 3/2012 | Mikulak et al. |
| 2012/0164256 A1 | 6/2012 | Swanson et al. |
| 2012/0165448 A1 | 6/2012 | Lee et al. |
| 2012/0231225 A1 | 9/2012 | Mikulak et al. |

(Continued)

FOREIGN PATENT DOCUMENTS

| | | |
|---|---|---|
| CA | 2834178 A1 | 12/2012 |
| CN | 102325646 A | 1/2012 |

(Continued)

OTHER PUBLICATIONS

European Communicaiton Pursuant to Article 94(3) EPC dated Apr. 12, 2018 for corresponding European Application No. 13857272.2, filed May 20, 2015.

(Continued)

*Primary Examiner* — Edward J Cain

(74) *Attorney, Agent, or Firm* — Westman, Champlin & Koehler, P.A.

(57) ABSTRACT

A polymeric material includes a semi-crystalline polymer and a secondary material wherein when the secondary material is combined with the semi-crystalline polymer to form a blend having at least a 3° C. reduction in a hot crystallization temperature relative to the neat semi-crystalline polymer.

21 Claims, 20 Drawing Sheets

(56) References Cited

U.S. PATENT DOCUMENTS

| | | |
|---|---|---|
| 2012/0259052 A1 | 10/2012 | Nelson et al. |
| 2012/0329932 A1 | 12/2012 | Mathieu et al. |
| 2013/0077996 A1 | 3/2013 | Hanson et al. |
| 2013/0077997 A1 | 3/2013 | Hanson et al. |
| 2013/0186549 A1 | 7/2013 | Comb et al. |
| 2013/0186558 A1 | 7/2013 | Comb et al. |
| 2013/0333798 A1 | 12/2013 | Bosveld et al. |
| 2013/0337256 A1 | 12/2013 | Farmer et al. |
| 2014/0141166 A1 | 5/2014 | Rodgers |
| 2014/0141168 A1 | 5/2014 | Rodgers |
| 2015/0252781 A1 | 9/2015 | Bech |

FOREIGN PATENT DOCUMENTS

| | | |
|---|---|---|
| EP | 2465884 A1 | 6/2012 |
| JP | 7502299 A | 3/1995 |
| JP | 1997-085839 A | 3/1997 |
| JP | 2005531439 A | 10/2005 |
| JP | 2006-525159 A | 11/2006 |
| JP | 2008505243 A | 2/2008 |
| JP | 2008-207619 A | 3/2008 |
| KR | 10-0712018 B1 | 4/2007 |
| WO | 2014081594 A1 | 5/2014 |

OTHER PUBLICATIONS

Canadian Examiners Report dated Apr. 23, 2018 for corresponding Canadian Application No. 2930968, filed May 17, 2016.
Canadian Examiners Report dated Apr. 27, 2018 for corresponding Canadian Application No. 2891473, filed May 13, 2015.
Diegel, O., et al; Journal of Sustainable Development, 2010, vol. 3, No. 3, p. 68-75.
Canadian Office Action dated Aug. 21, 2017, for corresponding Canadian Application No. 2930968, filed May 17, 2016.
Chinese Office Action dated Nov. 1, 2017 for corresponding Chinese Application No. 201480065109.1, filed May 27, 2016.
Japanese Office Action dated Nov. 14, 2017 for corresponding Japanese Application No. 2015-544081, filed May 21, 2015.
Canadian Examiner's Report dated Sep. 13, 2017 for corresponding Canadian Application No. 2891473, filed May 13, 2015.
Japanese Office Action dated Jul. 4, 2017 for corresponding Japanese Patent Application No. 2016-533708, filed on May 24, 2016.
Chinese Office Action dated Mar. 3, 2017 for corresponding Chinese Application No. 201480065109.1, filed May 27, 2016.
Lina Zhang et al., "Modern Researching Methodologies of Polymer Physics,", Wuhan University Press, p. 223.
Korean Office Action dated Mar. 31, 2017 for corresponding Korean Application No. 10-2016-7016999, filed Jun. 24, 2016.
Japanese Office Action dated Jan. 10, 2017 for corresponding Japanese Application No. 2015-544081, filed Nov. 13, 2013.
International Search Report and Written Opinion dated Nov. 15, 2016 for corresponding International Application No. PCT/US2016/034096, filed May 25, 2016.
Korean Office Action dated Sep. 20, 2016 for corresponding Korean Application No. 10-2015-7016464, filed Jun. 19, 2015.
Canadian Office Action dated Oct. 12, 2016 for corresponding Canadian Application No. 2891473, filed May 13, 2015.
Australian Office Action dated Nov. 3, 2016 for corresponding Australian Application No. 2014354930, filed May 19, 2016.
Invitation to Pay Additional Fees dated Aug. 5, 2016 for corresponding International Application No. PCT/US2016/034096, filed May 25, 2016.
International Search Report and Written Opinion dated Jan. 28, 2014 for corresponding International Patent Application No. PCT/US2013/069793, filed Nov. 13, 2013.
International Search Report and Written Opinion dated Feb. 13, 2015 for corresponding International Application No. PCT/US2014/067093, filed Nov. 24, 2014.
Canadian Office Action dated Feb. 21, 2019 for corresponding Canadian Application No. 2,891,473, filed May 13, 2015.
Canadian Office Action dated Dec. 11, 2019 for corresponding Canadian Application No. 2,891,473, filed May 13, 2015. 6 pages.
European Opposition with English Translation, Application No. 14820975.2, dated Jan. 10, 2020, 36 pages.

SEMI-CRYSTALLINE BUILD MATERIALS

CROSS-REFERENCE TO RELATED APPLICATION(S)

The present application claims priority to and is a Continuation-in-Part of U.S. patent application Ser. No. 14/532,465 filed on Nov. 4, 2014 which claims the benefit of U.S. Provisional Application No. 61/909,611, entitled "METHOD FOR PRINTING THREE-DIMENSIONAL PARTS WTIH CRYSTALLIZATION KINETICS CONTROL", and filed on Nov. 27, 2013, the contents of both identified applications are incorporated herein in their entireties.

BACKGROUND

The present disclosure relates to additive manufacturing techniques for printing three-dimensional (3D) parts. In particular, the present disclosure relates to additive manufacturing methods for printing 3D parts in a layer-by-layer manner from part materials having one or more semi-crystalline polymeric materials. All references disclosed herein are incorporated by reference.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques such as fused deposition modeling (FDM), electro-photography (EP), jetting, selective laser sintering (SLS), high speed sintering (HSS), powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure relates to a polymeric material that includes a semi-crystalline polymer and a secondary material wherein when the secondary material is combined with the semi-crystalline polymer to form a blend having an enthalpy that is between about 2 J/g heat of fusion and about 80% of the heat of fusion of the neat semi-crystalline polymer, as measured by differential scanning calorimetry (DSC) when cooling from a melting temperature to a hot crystalline temperature at a rate of 10° C./min. A plasticizer in the range of about 5 wt. % and about 30 wt. % is added to reduce a glass transition temperature to a range between about 20° C. and about 45° C.

An aspect of the present disclosure relates to a polymeric material that includes a semi-crystalline polymer and a secondary material wherein when the secondary material is combined with the semi-crystalline polymer to form a blend with at least at 3° C. reduction in a hot crystallization temperature relative to the neat semi-crystalline polymer.

Definitions

Unless otherwise specified, the following terms as used herein have the meanings provided below:

The term "polymer" refers to a polymeric material having one or more monomer species, including homopolymers, copolymers, terpolymers, and the like.

The term "semi-crystalline polymer" refers to a polymer having an enthalpy of fusion of greater than 2 J/g, when measured from above the melting temperature to below the hot crystallization temperature. The term "amorphous polymer" refers to a polymer that is not a semi-crystalline polymer.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

Unless otherwise specified, characteristics of a material or a 3D item printed from the material refer to the characteristics as measured parallel to the orientation of the 3D item layers and perpendicular to the layer-printing direction, and is referred to as an "xy-direction". Correspondingly, the term "z-direction", with reference to characteristics of a material or a 3D item printed from the material refer to the characteristics as measured perpendicular to the orientation of the 3D item layers and parallel to the layer-printing direction. Unless the measurement direction is specified as "in the z-direction", a measurement referred to herein is taken in the xy-direction. For example, a tensile strength of a 3D item of 10,000 psi refers to a tensile strength measured parallel to the layers of the 3D item. Alternatively, a tensile strength of a 3D item in the z-direction of 8,000 psi refers to a tensile strength measured perpendicular to the layers of the 3D item.

Unless otherwise specified, temperatures referred to herein are based on atmospheric pressure (i.e. one atmosphere).

The term "additive manufacturing system" refers to a system that prints, builds, or otherwise produces 3D items and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The term "providing", such as for "providing a consumable material", when recited in the claims, is not intended to require any particular delivery or receipt of the provided item. Rather, the term "providing" is merely used to recite items that will be referred to in subsequent elements of the claim(s), for purposes of clarity and ease of readability.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

DETAILED DESCRIPTION

Figure 1:
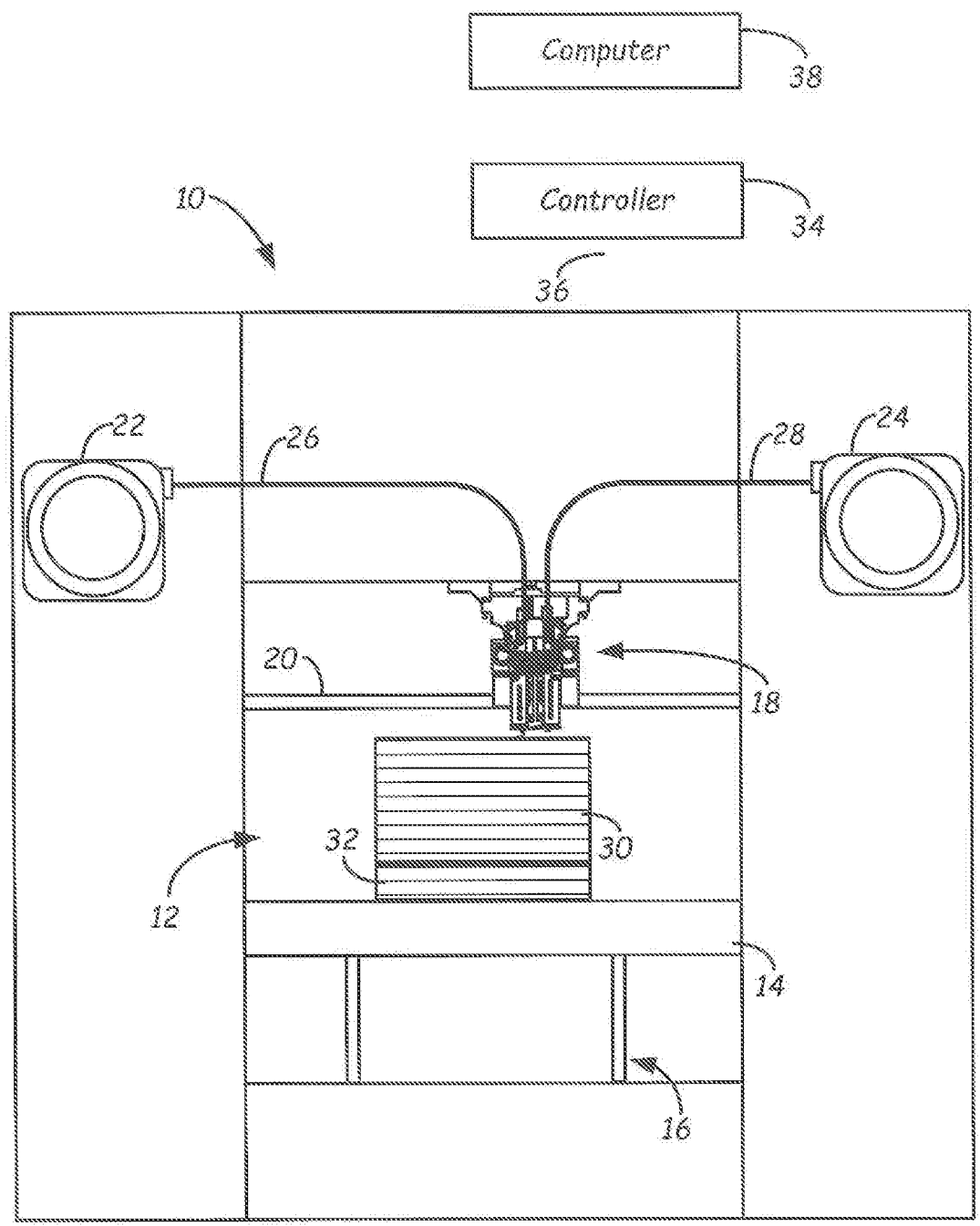
FIG. 1 is a front view of an additive manufacturing system configured to print 3D items pursuant to the method of the present disclosure.

The present disclosure is directed to an additive manufacturing method for printing 3D items in a layer-by-layer manner from a build material that compositionally includes a blend of one or more semi-crystalline polymers and one or more secondary materials. The combination of the semi-crystalline polymer(s) and the secondary material(s) interact to control the rate or kinetics at which crystallization occurs. The controlled crystallization kinetics results in diminished forces and stresses relative to uncontrolled crystallization, such that layers containing semi-crystalline polymer(s) can be used to build an item through additive manufacturing in a layer by layer manner that previously could not be accomplished. Additionally, the controlled rate or kinetics at which crystallization occurs generates sufficient heat of fusion or enthalpy to induce molecular reptation at the extrudate-item interface to bond the extruded layer to the item such that the layers have a sufficient bond to prevent de-lamination.

The disclosed method can be utilized to print an item with a number of commercially available semi-crystalline polymer(s) and/or co-polymer(s), including but not limited to, polyester(s), polyamide(s), such as, but not limited to, nylon(s), polysulfone(s) and ketone(s), such as, but not limited to, polyetheretherketone (PEEK), and polyetherketoneketone (PEKK) and combinations thereof. However, the disclosed method is not limited to above the semi-crystalline polymer(s) and/or co-polymer(s), but rather the disclosed method can be utilized with any semi-crystalline polymer(s) and/or co-polymer(s) having the capability of being utilized in an additive manufacturing device.

In some instances, depending upon the material desired to print the item, the method involves controlling the crystallization kinetics of the semi-crystalline polymer(s) upon cooling from a melted state to minimize or otherwise reduce the percent crystallinity of the printed item, while also generating sufficient crystallization-exothermic energy to induce molecular reptation at the extrudate-item interface. The rate of crystallinity can be reduced by providing a build material that compositionally includes one or more semi-crystalline polymers and one or more secondary materials that are configured to retard crystallization of the one or more semi-crystalline polymers, where the one or more secondary materials are substantially miscible with the one or more semi-crystalline polymers. Additionally, direct polymerization or selection of specially polymerized polymers, which are synthesized with disrupted structural regularity can be utilized that where the molecular structure limits and moderates their crystallization kinetics and mechanics.

In other instances, depending upon the material desired to print the item, the method involves controlling the crystallization kinetics of the semi-crystalline polymer(s) to increase the kinetics or rate at which the crystals are formed upon cooling from a melted state, such that the item has a selected crystallinity while also generating sufficient heat of fusion or entropy to induce molecular reptation at the extrudate-item interface. Typically, acceleration of the crystallization kinetics is required when the semi-crystalline polymer in pure form exhibits less than 5 J/g enthalpy when cooled at 10° C./min cooling as measured by differential scanning calorimetry (DSC) when cooling from the melting temperature to the hot crystalline temperature at a rate of 10° C./min. The acceleration of the crystallization kinetics increases the enthalpy to at least 5 J/g when cooled at 10° C./min cooling as measured by differential scanning calorimetry (DSC) when cooling from the melting temperature to the hot crystalline temperature at a rate of 10° C./min.

For instance, in FDM and EP additive manufacturing systems, acceleration of the crystallization kinetics allows the copolymer to be held within a range of the glass transition temperature and a cold crystallization temperature due to the development of small, but significant modulus and crystallinity. Techniques for accelerating the kinetics of certain polymers, such as certain polyketone and polyester copolymers include the addition of micron-scale additives, such as synthetic fibers, minerals (natural or synthetic). The addition of one or more immiscible secondary polymers, which are finely dispersed as a discrete phase through compounding techniques common in polymer processing can also be utilized to increase the crystallization kinetics.

In order to effectively induce molecular reptation at the extrudate-item and sufficiently diminish the forces and stresses caused by volumetric shrinkage associated with typical crystallization of the semi-crystalline polymer in a layer as it is cooled, a process window is created by slowing the crystallization kinetics such that where the polymer(s) generate between about 2 J/g heat of fusion and about 80% of the heat of fusion of a build material that is compositionally about 100% of the semi-crystalline build material, as measured by differential scanning calorimetry (DSC) when cooling from the melting temperature to the hot crystalline temperature at a rate of 10° C./min. When accelerating the crystallization kinetics a minimum entropy of about 5 J/g is desired. The disclosed ranges represents a continuum of the percentage of crystallinity in the build material where at the lower end of the range, the build material has properties more closely related to crystalline materials and at the upper end of the range, the build material has properties more closely related to amorphous materials. The disclosed ranges also describe the range of useful entropy for unfilled materials at the low enthalpy and heavily filled materials, at the high enthalpy end of the range.

The manner in which the crystallization kinetics of the item material are controlled can vary depending on the additive manufacturing technique used, such as an extrusion-based additive manufacturing technique including fused deposition modeling (FDM) and out of oven FDM (OOO), big area additive manufacturing (BAAM) and electrophotography-based additive manufacturing technique (EP), which is typically between the glass transition temperature and a cold crystallization temperature or a solidification temperature and the cold crystallization temperature. A selective laser sintering technique (SLS) or a high speed sintering technique (HSS) use a different process window in relative to extrusion-based additive manufacturing technique that is typically slightly above a hot crystallization temperature and slightly below a melt temperature. However, for HHS devices a process window between the glass transition temperature and the cold crystallization temperature could be used for some materials. These distinctions are primarily due to the different thermal states in which the printed layers are typically held for the given additive manufacturing techniques.

With respect to SLS and HSS additive manufacturing systems, the secondary material or materials is utilized to retard or slow the availability of the formation of crystallites. The retarding or slowing of the availability of the formation of crystallites can be caused by adding an amorphous polymer that is miscible with the semi-crystalline material and forms an amorphous alloy which lowers the hot crystallization temperature. Alternatively, a monomer can be added as the secondary material or materials to form a copolymer that breaks the long range order of the polymer and hinders the availability of the formation of crystallites and therefore depresses the hot crystallization temperature. The crystallites will maintain their respective energies required to break intermolecular bonds and hence the melting temperature of the alloy or copolymer will not change significantly.

However, the addition of the amorphous, miscible polymer or the irregular monomer with the semi-crystalline material will decrease the hot crystallization temperature and the rate at which the crystallites form. While the amount of the secondary material will depend upon the polymer class, the combination of the secondary material, whether an amorphous miscible polymer or an irregular monomer, will cause a depression in the hot crystallization temperature. However, the depression or reduction of the hot cyrstallization temperature will allow the use of semi-crystalline materials in HSS and SLS additive manufacturing devices that typically could not be utilized.

The secondary material represses the hot crystallization temperature at least about 3° C. The secondary material represses the hot crystallization temperature at least about 5° C. and more typically at least about 10° C. The larger the repression of the hot crystallization temperature, the larger the processing window and the lower operating temperature can be, which can be advantageous especially when operating an SLS or HSS device.

With respect to OOO devices, semi-crystalline materials similar to that used in extrusion techniques are utilized. However a sufficient amount of plasticizer is added to reduce the glass transition temperature to between a range of 20° C. and about 45° C. such that the environment of does not require heating. By reducing the glass transition temperature, lower residual stress are retained in the item manufactured by OOO devices.

Fillers and reinforcing agents can be added to the polymer matrix to increase the heat deflection temperature. For instance, after annealing the item containing carbon fiber, significant increases in the heat deflection temperature can be realized.

A non-limiting list of semi-crystalline polymers that can be utilized includes polycarpolactum PA6 and semicrystalline copolyester PET. However, other semi-crystalline polymers and secondary materials are also contemplated.

By way of example, extrusion-based additive manufacturing systems typically print or otherwise build 3D items from amorphous polymeric materials, such as acrylonitrile-butadiene-styrene (ABS) resins and polycarbonate resins. During a printing operation, the amorphous polymeric material is melted and extruded as a series of roads, which cool down to form layers of a 3D item. Due to the layer-by-layer nature of the printing, the cooling of each successive layer generates residual stresses in the 3D item, which are a function of the coefficient of thermal expansion, percent shrinkage, and tensile modulus of the material. If not relieved, the residual stresses may physically distort the 3D item, such as by causing the edges and corners of the 3D item to curl up, referred to as "curl" or "curling".

Amorphous polymeric materials have little or no ordered arrangements of their polymer chains in their solid states. As such, these materials exhibit glass transition effects that can be controlled to partially relieve residual stresses. For example, as disclosed in Batchelder, U.S. Pat. No. 5,866,058, an amorphous polymeric material may be deposited into a heated chamber (or at least a locally-heat deposition region) maintained at a temperature that is between a solidification temperature and a glass transition temperature of the material. This anneals the successively-printed printed layers, allowing them to cool down and solidify slowly, which can partially relieve the residual stresses.

Semi-crystalline polymeric materials, however, have different mechanical and thermal characteristics from amorphous polymeric materials. For example, due to their achievable crystallinity, 3D items printed with semi-crystalline polymeric materials may exhibit superior mechanical properties compared to 3D items printed with amorphous polymeric materials. However, due to their higher levels of achievable crystallinity, semi-crystalline polymeric materials can exhibit discontinuous changes in volume upon solidification. Therefore, layers of a semi-crystalline polymeric material may contract and shrink when deposited, thereby accumulating inacceptable residual stresses.

In comparison to amorphous polymeric materials, which can have relatively broad annealing windows, it has been conventionally difficult to maintain a temperature window that is suitable for annealing semi-crystalline polymers, particularly with extrusion-based additive manufacturing systems. For instance, curl will result if the polymer is held at a temperature above or below the process window. Any variations outside of this small temperature window will result in solidification with discontinuous changes in volume, such as curl, if above or below the temperature window. The discontinuous changes in volume can be particularly troublesome for extrusion-based additive manufacturing systems where the printed 3D items or support structures are coupled to underlying and non-shrinkable build sheets. Furthermore, sagging may occur if there is not enough crystallinity generated during the cooling process. Each of these conditions may result in distortions of the printed 3D item. As such, it has been difficult to print dimensionally stable 3D items from semi-crystalline polymers using extrusion-based additive manufacturing systems, where the amount of crystallinity formed during the cooling process is sufficient such that the 3D items do not sag, yet also do not induce curl forces that will curl the 3D item.

It is important that the crystallization kinetics are accurate and correct for the semi-crystalline material with the secondary material, otherwise a process window cannot be determined. In FDM manufacturing systems, the whole item is built with partial crystallinity and the support materials are removed. After the support materials are removed, the item is annealed at a selected temperature for a selected amount of time to congruently crystallize the part and prevent warping.

In SLS additive manufacturing, the item is built with build material in an amorphous state between hot crystallization temperature and below the melt temperature. The entire part is then cooled and crystallized in a single step.

However, as discussed below, the crystallization kinetics of particular build materials can be controlled in an extrusion-based additive manufacturing system to print 3D items having mechanical properties (e.g., strengths and ductilities) similar to those of semi-crystalline polymeric materials, while also being annealable in a heated chamber of an additive manufacturing system (or at least a locally-heated deposition region) to partially relieve residual stresses.

Figure 2:
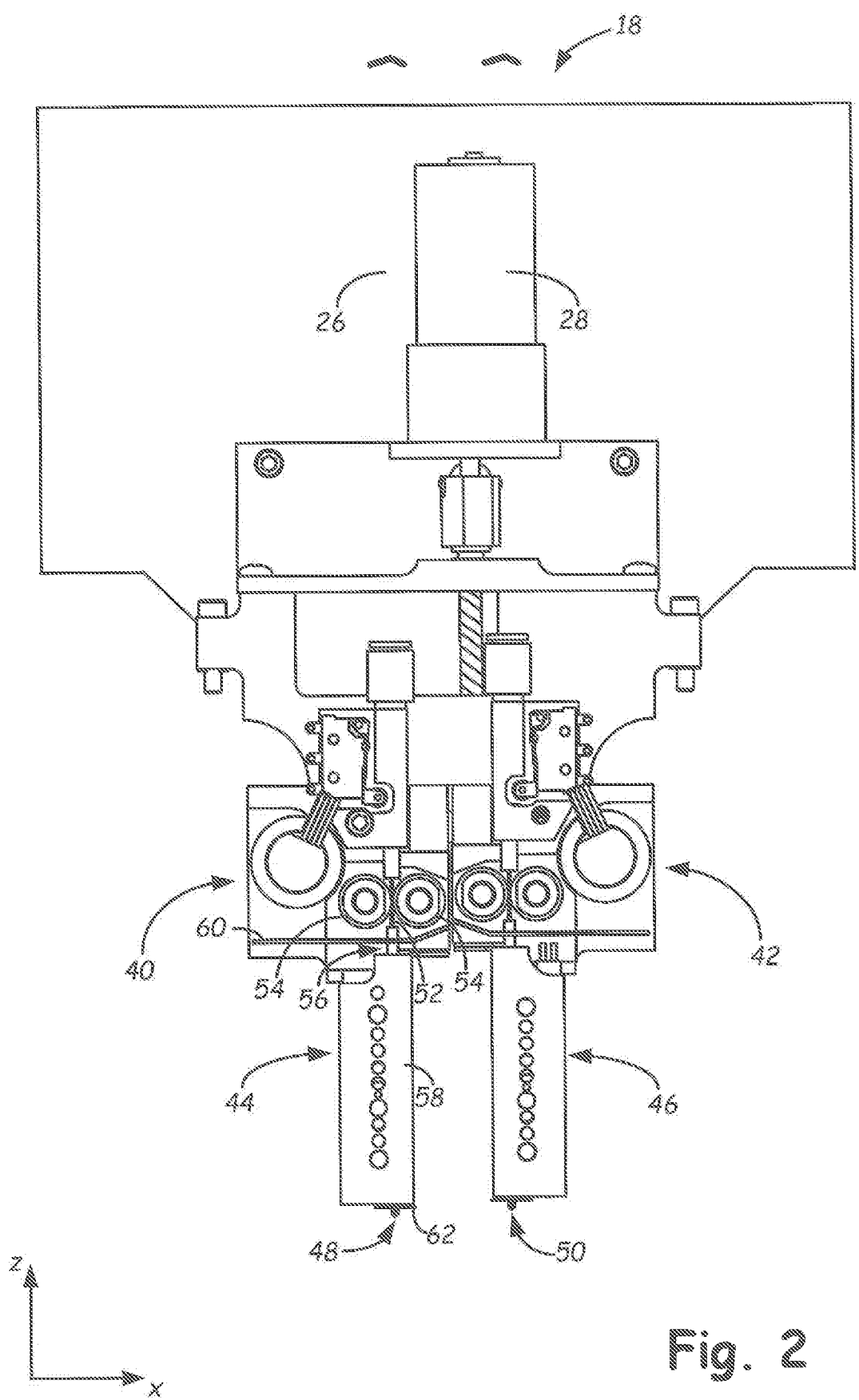
FIG. 2 is a front view of a print head of the additive manufacturing system.
Figure 3:
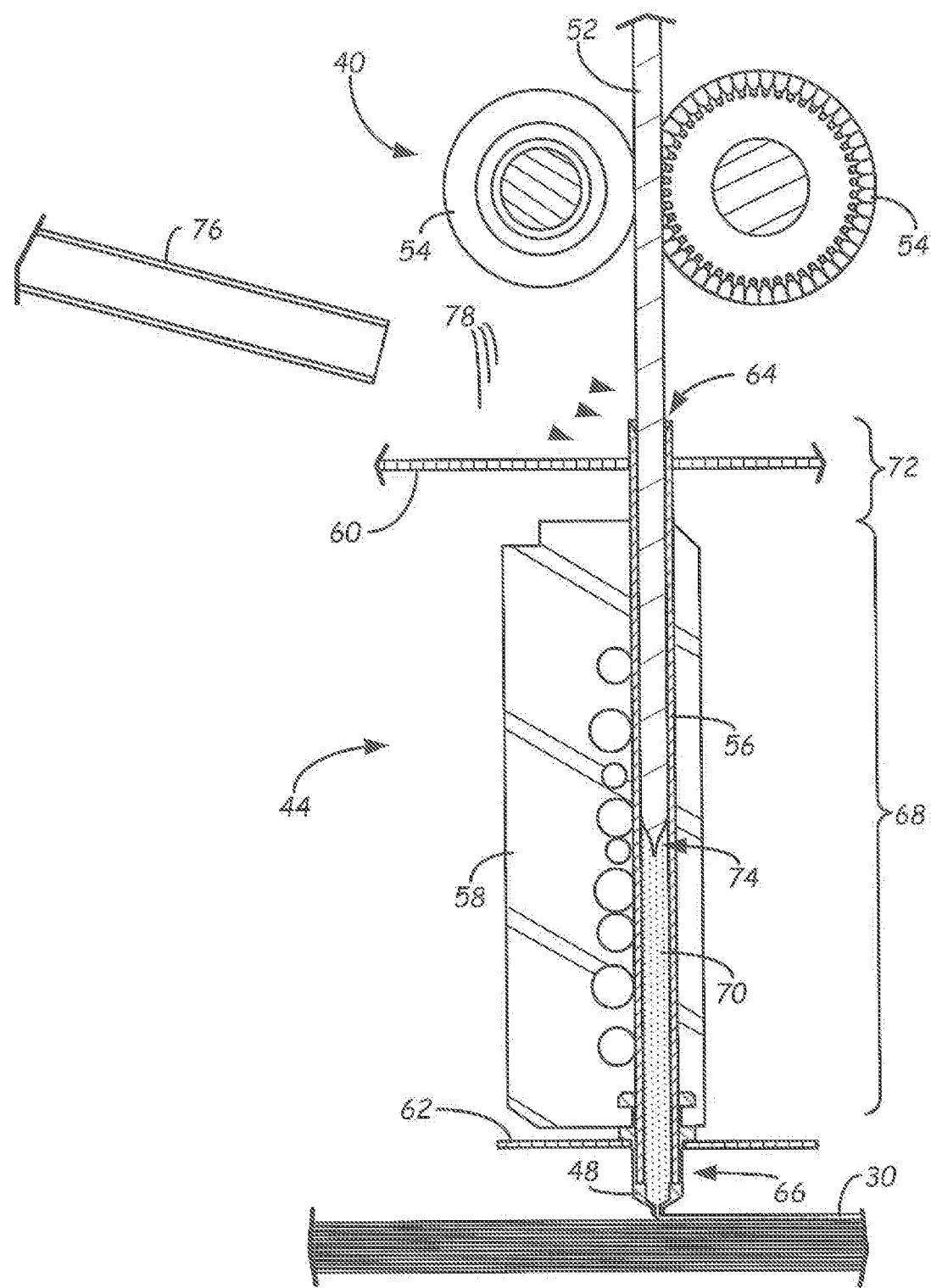
FIG. 3 is an expanded sectional view of a drive mechanism, a liquefier assembly, and a nozzle of the print head.

FIGS. 1-3 illustrate system 10, which is an extrusion-based additive manufacturing system for printing or otherwise building 3D items, from the build material blends discussed herein, in a manner that controls the crystallization kinetics, as discussed below. Suitable extrusion-based additive manufacturing systems for system 10 include fused deposition modeling systems developed by Stratasys, Inc., Eden Prairie, Minn. under the trademark "FDM".

As shown in FIG. 1, system 10 may include chamber 12, platen 14, platen gantry 16, print head 18, head gantry 20, and consumable assemblies 22 and 24. Chamber 12 is an example enclosed build environment that contains platen 14 for printing 3D items and support structures, where chamber 12 may be may be optionally omitted and/or replaced with different types of build environments. For example, a 3D item and support structure may be built in a build environment that is open to ambient conditions or may be enclosed with alternative structures (e.g., flexible curtains).

In the shown example, the interior volume of chamber 12 may be heated with heater 12h to reduce the rate at which the build and support materials solidify after being extruded and deposited (e.g., to reduce distortions and curling). Heater 12h may be any suitable device or assembly for heating the interior volume of chamber 12, such as by radiant heating and/or by circulating heated air or other gas (e.g., inert gases). In alternative embodiments, heater 12h may be replaced with other conditioning devices, such as a cooling unit to generate and circulate cooling air or other gas. The particular thermal conditions for the build environment may vary depending on the particular consumable materials used.

In further embodiments, the heating may be localized rather than in an entire chamber 12. For example, the deposition region may be heated in a localized manner. Example techniques for locally-heating a deposition region include heating platen 14 and/or with directing heat air jets towards platen 14 and/or the 3D items/support structures being printed). As discussed above, the heating in chamber 12 and/or the localized deposition region anneals the printed layers of the 3D items (and support structures) to partially relieve the residual stresses, thereby reducing curling of the 3D items.

Platen 14 is a platform on which 3D items and support structures are printed in a layer-by-layer manner. In some embodiments, platen 14 may also include a flexible polymeric film or liner on which the 3D items and support structures are printed. In the shown example, print head 18 is a dual-tip extrusion head configured to receive consumable filaments from consumable assemblies 22 and 24 (e.g., via guide tubes 26 and 28) for printing 3D item 30 and support structure 32 on platen 14. Consumable assembly 22 may contain a supply of the build material for printing 3D item 30 from the build material. Consumable assembly 24 may contain a supply of a support material for printing support structure 32 from the given support material.

Platen 14 is supported by platen gantry 16, which is a gantry assembly configured to move platen 14 along (or substantially along) a vertical z-axis. Correspondingly, print head 18 is supported by head gantry 20, which is a gantry assembly configured to move print head 18 in (or substantially in) a horizontal x-y plane above chamber 12.

In an alternative embodiment, platen 14 may be configured to move in the horizontal x-y plane within chamber 12, and print head 18 may be configured to move along the z-axis. Other similar arrangements may also be used such that one or both of platen 14 and print head 18 are moveable relative to each other. Platen 14 and print head 18 may also be oriented along different axes. For example, platen 14 may be oriented vertically and print head 18 may print 3D item 30 and support structure 32 along the x-axis or the y-axis.

System 10 also includes controller 34, which is one or more control circuits configured to monitor and operate the components of system 10. For example, one or more of the control functions performed by controller 34 can be implemented in hardware, software, firmware, and the like, or a combination thereof. Controller 34 may communicate over communication line 36 with chamber 12 (e.g., with a heating unit for chamber 12), print head 18, and various sensors, calibration devices, display devices, and/or user input devices.

In some embodiments, controller 34 may also communicate with one or more of platen 14, platen gantry 16, head gantry 20, and any other suitable component of system 10. While illustrated as a single signal line, communication line 36 may include one or more electrical, optical, and/or wireless signal lines, allowing controller 34 to communicate with various components of system 10. Furthermore, while illustrated outside of system 10, controller 34 and communication line 36 may be internal components to system 10.

System 12 and/or controller 34 may also communicate with computer 38, which is one or more computer-based systems that communicates with system 12 and/or controller 34, and may be separate from system 12, or alternatively may be an internal component of system 12. Computer 38 includes computer-based hardware, such as data storage devices, processors, memory modules and the like for generating and storing tool path and related printing instructions. Computer 38 may transmit these instructions to system 10 (e.g., to controller 34) to perform printing operations. Controller 34 and computer 38 may collectively be referred to as a controller assembly for system 10.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Patent Application Publication No. 2012/0164256.

In the shown dual-tip embodiment, print head 18 includes two drive mechanism 40 and 42, two liquefier assemblies 44 and 46, and two nozzles 48 and 50. In this embodiment the build material and the support material each preferably have a filament geometry for use with print head 18. For example, as best shown in FIG. 3, the build material may be provided as filament 52. In alternative embodiments, the build material of the present disclosure may be provided in powder or pellet form for use in an auger-pump print head, such as disclosed in Bosveld et al., U.S. Publication No. 2013/0333798.

During operation, controller 34 may direct wheels 54 of drive mechanism 40 to selectively draw successive segments filament 52 from consumable assembly 22 (via guide tube 26), and feed filament 52 to liquefier assembly 44. Liquefier assembly 44 may include liquefier tube 56, thermal block 58, heat shield 60, and tip shield 62, where liquefier tube 56 includes inlet end 64 for receiving the fed filament 52. Nozzle 48 and tip shield 62 are accordingly secured to outlet end 66 of liquefier tube 56, and liquefier tube 56 extends through thermal block 58 and heat shield 60.

While liquefier assembly 44 is in its active state, thermal block 58 heats liquefier tube 56 to define heating zone 68. The heating of liquefier tube 56 at heating zone 68 melts the build material of filament 52 in liquefier tube 56 to form melt 70. The upper region of liquefier tube 56 above heating zone 68, referred to as transition zone 72, is not directly heated by thermal block 58. This generates a thermal gradient or profile along the longitudinal length of liquefier tube 56.

The molten portion of the build material (i.e., melt 70) forms meniscus 74 around the unmelted portion of filament 52. During an extrusion of melt 70 through nozzle 48, the downward movement of filament 52 functions as a viscosity pump to extrude the build material of melt 70 out of nozzle 48 as extruded roads to print 3D item 30 in a layer-by-layer manner. While thermal block 58 heats liquefier tube 56 at heating zone 68, cooling air may also be blown through a manifold 76 toward inlet end 64 of liquefier tube 56, as depicted by arrows 78. Heat shield 60 assists in directing the air flow toward inlet end 64. The cooling air reduces the temperature of liquefier tube 56 at inlet end 64, which prevents filament 52 from softening or melting at transition zone 72.

In some embodiments, controller 34 may servo or swap liquefier assemblies 44 and 46 between opposing active and stand-by states. For example, while liquefier assembly 46 is servoed to its active state for extruding the support material to print a layer of support structure 32, liquefier assembly 44 is switched to a stand-by state to prevent the build material from being extruded while liquefier assembly 46 is being used. After a given layer of the support material is completed, controller 34 then servoes liquefier assembly 46 to its stand-by state, and switches liquefier assembly 44 to its active state for extruding the build material to print a layer of 3D item 30. This servo process may be repeated for each printed layer until 3D item 30 and support structure 32 are completed.

While liquefier assembly 46 is in its active state for printing support structure 32 from a support material filament, drive mechanism 42, liquefier assembly 46, and nozzle 50 (each shown in FIG. 2) may operate in the same manner as drive mechanism 40, liquefier assembly 44, and nozzle 48 for extruding the support material. In particular, drive mechanism 40 may draw successive segments of the support material filament from consumable assembly 24 (via guide tube 28), and feed the support material filament to liquefier assembly 46. Liquefier assembly 46 thermally melts the successive segments of the received support material filament such that it becomes a molten support material. The molten support material may then be extruded and deposited from nozzle 50 as a series of roads onto platen 14 for printing support structure 32 in a layer-by-layer manner in coordination with the printing of 3D item 30.

As mentioned above, the build material compositionally includes a blend of one or more semi-crystalline polymers and one or more secondary materials that may either retard crystallization of the semi-crystalline polymer(s) or accelerate the formation of crystals within the build material. When retarding crystallization, the secondary material(s) include one or more amorphous polymers that are at least partially miscible, and typically completely miscible, with the semi-crystalline polymer(s). Also, the use of polymers with disrupted structural regularity (or steric hindrance) that limits and moderates the crystallization mechanics to retard crystallization. When accelerating crystallization, secondary materials are added that cause the formation of crystals including but not limited to, the addition of micro-scale additive such as synthetic fibers, natural or synthetic minerals, the addition of immiscible secondary polymers that are dispersed as a discrete phase through known compounding techniques. Again, whether the crystallization kinetics are to be retarded or accelerated depends upon the physical properties of the selected semi-crystalline build material(s).

Figure 4:
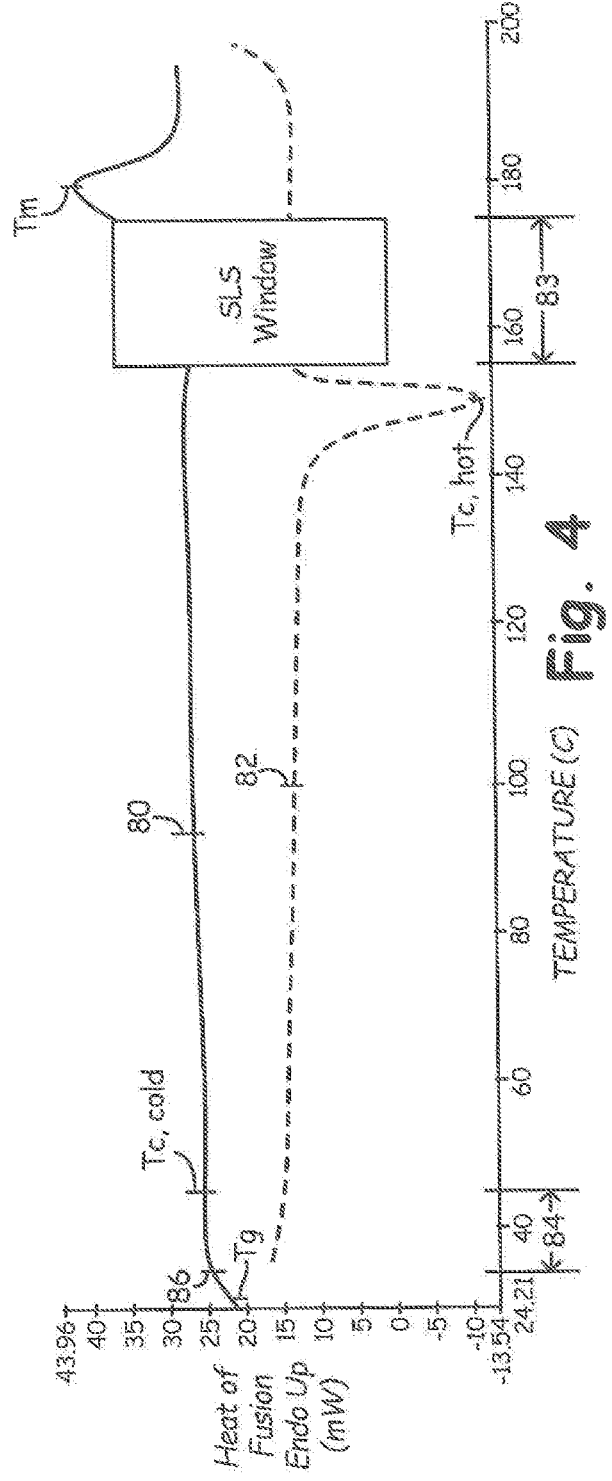
FIG. 4 is an illustrative differential scanning calorimetry (DSC) plot of heat flow versus temperature for an exemplary build material.

FIG. 4 illustrates a DSC plot for an exemplary build material. The build material is nylon 12 under the trade designation Grivory® L16 manufactured by EMS-Grivory business unit of EMS-Chemie AG, located at Domat/Ems, Switzerland. The DSC pot in FIG. 4 shows the various thermal transitions that the next build material may exhibit. For example, during an initial heating phase, such as when the build material is melted in liquefier assembly 44, the build material may produce a heating profile 80 with a glass transition temperature ($T_g$), a cold crystallization temperature ($T_{c,cold}$), and a melting temperature ($T_m$). The glass transition temperature ($T_g$) refers to the point along curve 80 where the build material undergoes a second-order transition to achieve an increase in its heat capacity.

The cold crystallization temperature $T_{c,cold}$ typically occurs due to the increased mobility of the polymer molecules after exceeding the glass transition temperature $T_g$, which allows a portion of the semi-crystalline polymer(s) to form crystalline regions. Because the crystallization is an exothermic process, it releases thermal energy based on a first-order transition, as illustrated by the inverted peak in heating profile 80.

The melting temperature $T_m$ is the temperature at which the build material fully liquefies, also based on a first-order transition. Typically, the build material is quickly heated past its melting temperature $T_m$ in liquefier assembly 44 for extrusion. As such, during this point in the process, the glass transition temperature $T_g$ and the cold crystallization temperature $T_{c,cold}$ are not overly relevant to the crystallization state of the extrudate, other than for potential melt flow and temperature control aspects in liquefier assembly 44.

The DSC plot in FIG. 4 also includes a cooling profile 82, which illustrates hot crystallization temperature $T_{c,cold}$ and describes the crystallization kinetics of the build material as it cools down from its melting temperature $T_m$. For example, after being extruded from nozzle 48, the extruded build material may deposit as roads onto the previously-formed layer of 3D item 30, and begin cooling down. In other words, the build material begins to follow cooling profile 82 at a cooling rate that depends on the environment temperature that 3D item 30 is printed in (e.g. in chamber 12), as well as the particular composition of the build material and the size of 3D item 30.

Preferably, the layers of 3D item 30 are printed in chamber 12 (or at least in a locally-heated deposition region) that is maintained at a temperature between a solidification temperature and the cold crystallization temperature $T_{c,cold}$ of the build material. This can anneal the successively-printed printed layers, allowing them to cool down and solidify slowly, which can partially relieve the residual stresses.

Figure 5:
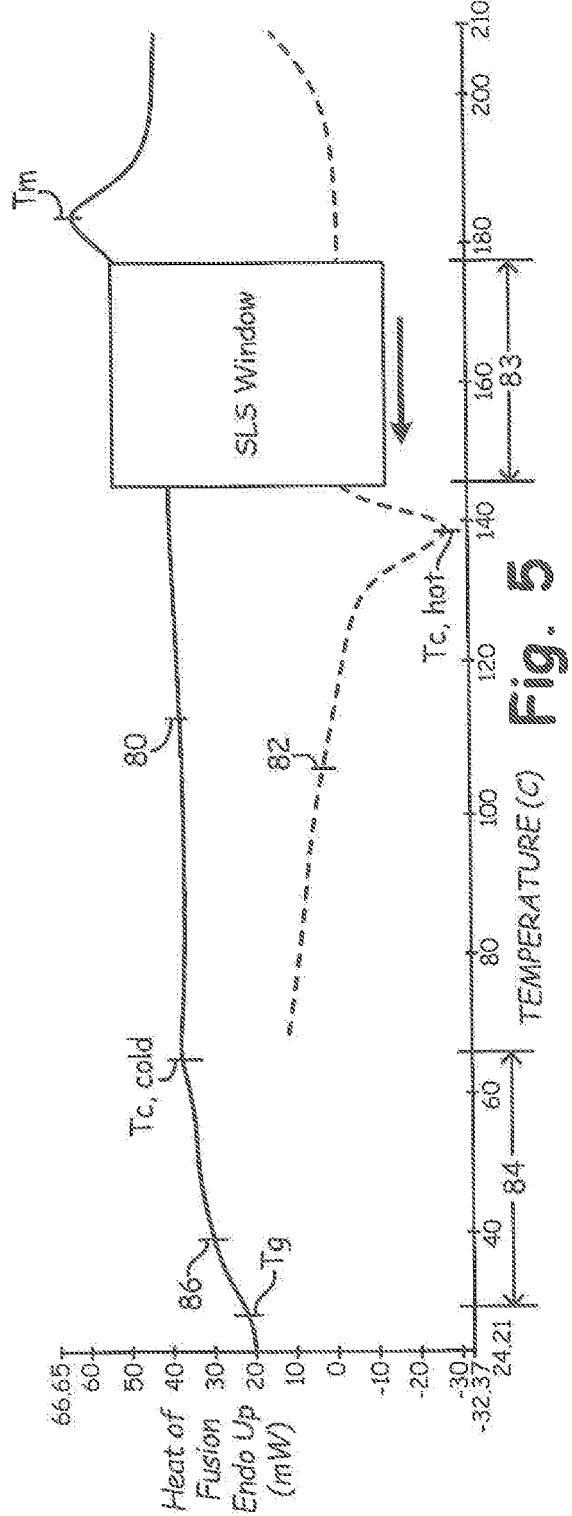
FIG. 5 is an illustrative DSC plot of heat flow versus temperature for an exemplary build material of FIG. 4 modified with a secondary material.

Referring to FIG. 5, the crystallization kinetics of the same semi-crystalline material in FIG. 4, that includes a miscible amorphous polymer which in this instance is Grilamid® TR 90 manufactured by EMS. TR 90 is a polyamide based on aliphatic and cycloaliphatic blocks and therefore is amorphous and completely miscible in the base material. While the range 81 between glass transition temperature ($T_g$) and the cold crystallization temperature ($T_{c,cold}$), are slightly changed, the temperature range 83 between the melting temperature $T_m$ and the hot crystallization temperature $T_{c,hot}$ is increased, either by increasing the melting temperature $T_m$ or reducing the hot crystallization temperature $T_{c,hot}$. The increase in the temperature range between the melting temperature $T_m$ or reducing the hot crystallization temperature $T_{c,hot}$ increases the operating window for additive manufacturing techniques such as SLS and HSS.

Particularly beneficial results include the suppression or reduction of the hot crystallization temperature $T_{c,hot}$, when using manufacturing techniques such as SLS and HSS. The suppression or reduction of the hot crystallization temperature $T_{c,hot}$, allows the built item to be annealed at lower temperatures relative to those of semi-crystalline materials that have not had the crystallization kinetics modified. The suppression of the hot crystallization temperature $T_{c,hot}$, allows the annealing process to be performed at temperatures that are lower than previously obtainable. As the removal of heat from the item being built is a limiting factor in the size of the item being built through either the SLS or HSS technique, the present disclosure provides the capability of increasing the size of the item being built with the SLS or HHS technique, up to the doubling of the size of the item being built relative to currently used processes and materials.

When using extrusion-based additive techniques such as FDM, BAAM, and EP, chamber 12 or the locally-heated deposition region is maintained at a temperature between a solidification temperature and the glass transition temperature $T_g$ of the build material. These embodiments are suitable for build materials having low levels of crystalline regions, where the crystalline regions are not capable of supporting the printed layers at higher temperatures without slumping.

Alternatively, in other embodiments, chamber 12 or the locally-heated deposition region is maintained at a temperature within an annealing window 84 having a lower limit at about the glass transition temperature $T_g$ of the build material and an upper limit that is less than the cold crystallization temperature $T_{c,cold}$ of the build material. In particular, annealing window 84 preferably encompasses the plateau region 86 of DSC heating curve 80, which is above the increased slope for the glass transition temperature $T_g$ and below the decreased slope for the cold crystallization temperature $T_{c,cold}$. These embodiments are suitable for build materials having enough crystalline regions to support the printed layers without slumping, despite being held above the glass transition temperature $T_g$ of the build material.

In further techniques, such as OOO, where low-temperature materials are used (e.g., those with glass transition temperatures near ambient temperatures), chamber 12 may be omitted, and the build material may be printed at room temperature (e.g., 25° C.). Regardless of the annealing temperature, it has been found that the substantially-miscible blends for the build material modify the glass transition temperature $T_g$ of the build material from that of the amorphous polymer(s), typically flowing the Flory-Fox Equation. The substantially-miscible blends may also decrease the hot crystallization temperature $T_{c,hot}$ of the build material from that of the pure semi-crystalline polymer(s). This provides a unique advantage in that the cumulative amount of crystallization for the build material upon cooling can be reduced, which accordingly allows the printed layers of the build material to have low levels of crystallinity.

In particular, upon being extruded and deposited from nozzle 48, the build material preferably is quickly cooled down past its hot crystallization temperature $T_{c,hot}$ to its annealing temperature below the cold crystallization temperature $T_{c,cold}$ of the build material (e.g., within annealing window 84). This effectively supercools the build material down below its cold crystallization temperature $T_{c,cold}$. It should also be noted that when sufficient amounts of filler such as, but not limited to glass and carbon fiber, items can be printed in the cold crystallization temperature $T_{c,cold}$ region, because the filler effectively retards the volumetric change during crystallization.

It has been found that the level of crystallinity can be controlled based on the particular annealing temperature used. For instance, if more amorphous properties are desired, the annealing temperature may be set to be set within about 5° C. of the glass transition temperature $T_g$ of the build material. Alternatively, if more crystalline properties are desired, the annealing temperature may be set to be set within 5° C. of the cold crystallization temperature $T_{c,cold}$ of the build material. Furthermore, any intermediate amorphous-crystalline variation may be achieved by maintaining the annealing temperature at a selected temperature within annealing window 84.

The incorporation of the amorphous polymer(s) also assists in physically impeding the semi-crystalline polymer(s) from grouping together in ordered arrangements to form crystalline regions. As such, as the build material quickly cools down from its melting temperature $T_m$, the short residence time in the region between its hot crystallization temperature $T_{c,hot}$ and its cold crystallization temperature $T_{c,cold}$, combined with the crystallization impedance, preferably minimizes or otherwise reduces the formation of crystalline regions in the build material.

For instance, if a given pure semi-crystalline polymer (i.e., non-blend) is capable of crystallizing to its fullest extent in about 3 seconds in the region between its hot crystallization temperature $T_{c,hot}$ and its cold crystallization temperature $T_{c,cold}$, and if it quickly cools down such that it resides in this region for about one second, it may form about one-third of is achievable of crystalline regions. In comparison, the crystallization impedance of the build material blend may require more than a 10 to 20-fold increase in the time required to fully crystallize. As such, when the build material resides in this region between its hot crystallization temperature $T_{c,hot}$ and its cold crystallization temperature $T_{c,cold}$ for about one second, it may only form about 1-3% of its fully-achievable crystallinity, for example. In fact, it has been observed that the supercooled build material exhibits a translucent, substantially non-opaque appearance. This is an indication that crystallinity has been significantly retarded since crystalline regions typically modify the indices of refraction of the extruded layers to render them opaque.

The minimized or reduced crystallization correspondingly reduces the discontinuous changes in volume of the semi-crystalline polymer(s), thereby reducing the residual stresses on the printed layers. Furthermore, holding the printed layers at the annealing temperature (e.g., within annealing window 84) also anneals the successively-printed printed layers, allowing them to cool down and solidify slowly, which can relieve the residual stresses typically associated with amorphous materials.

In other words, the build material is preferably supercooled quickly from its extrusion temperatures down to an annealing temperature in annealing window 84, and then held within annealing window 84 for a suitable duration to relieve the residual stresses. After that, the printed layers of the build material may be cooled down further (e.g., below its glass transition temperature $T_g$ and/or its solidification temperature).

Another interesting property of the build materials of the present disclosure is that, despite the minimized or reduced crystallinity, the crystallization that does occur during the supercooling generates a sufficient amount of heat to induce extra or increased molecular reptation at the extrudate-item interface. In other words, the heat produced during the limited crystallization-exothermic reaction allows the polymer molecules at the extrudate-item interface to move and become highly entangled. It has been observed that, due to the heat of fusion of the extruded roads, the rate of temperature decay of the extruded build material can change, and cool down at a slower rate. For example, in an interior raster pattern, this can result in an interfacial temperature boost, causing better reptation in the X-Y build plane, as long as the rastered roads contact each other before the extruded build material cools down to the annealing temperature in chamber 12. This accordingly increases the strength of the printed 3D item 30 in both the intra-layer x-y directions, and also in the interlayer z-direction. As a result, 3D item 30 may have mechanical properties (e.g., strengths and ductilities) similar to those of semi-crystalline polymer(s). Also, if the material is maintained at a temperature above the glass transition temperature, the transition is not necessary to be overcome to impart mobility at the item-extrudate interface.

In extrusion based printing techniques other than OOO, and with HSS once the printing operation is completed, 3D item 30 may then be cooled down to room temperature and optionally undergo one or more post-printing processes. Alternatively, 3D item 30 may be reheated in a post-printing crystallization step. In this step, 3D item 30 may be heated up to about its cold crystallization temperature $T_{c,cold}$ for a sufficient duration to induce further crystallization of the semi-crystalline polymer(s). Examples of suitable annealing durations in the post-printing crystallization step range from about 30 minutes to 3 hours, and may vary depending on the dimensions of each 3D item 30 and the build material compositions. Correspondingly, examples of suitable annealing temperatures in the post-printing crystallization step range from about the cold crystallization temperature $T_{c,cold}$ of the build material to within about 10° C. above its cold crystallization temperature $T_{c,cold}$, and more preferably to within about 5° C. above its cold crystallization temperature $T_{c,cold}$.

The post-printing crystallization step can further increase the mechanical, thermal, and chemical resistance properties of 3D item 30 due to the increased formation of the crystalline regions. Additionally, this post-printing crystallization step is performed on 3D item 30 as a whole (i.e., congruent crystallization), rather than as the layers are individually printed. As such, any potential shrinkage on 3D item 30 from the formation of the crystalline regions occurs in a uniform manner similar to the effects in an injection molding process, rather than in a layer-by-layer manner that can otherwise result in curling effects. Another important feature with the post-printing crystallization step is that 3D part 30 is preferably de-coupled from platen 14 (e.g., from a build sheet of platen 14), allowing 3D part 30 to be further crystallized without being restricted by any non-shrinkable build sheet or rigid support material. However, a supporting sand or powder may be acceptable.

As mentioned above, a 3D part 30 having a translucent, substantially non-opaque appearance is an indication that crystallinity has been retarded during the printing operation. Similarly, the transformation from the translucent, substantially non-opaque appearance to an opaque appearance is an indication that the build material of 3D item 30 has undergone significant crystallization in the post-printing crystallization step. After the post-printing crystallization step is completed, the resulting 3D item 30 may then be cooled down to room temperature and optionally undergo one or more post-printing processes.

The post-printing crystallization step may be performed in chamber 12 of system 10, or alternatively in a separate annealing oven. A separate annealing oven may be preferred in many situations, such as when support structure 32 needs to be removed prior to the post-printing annealing step and/or when system 10 needs to be used for subsequent printing operations. For example, a printing farm of multiple systems 10 may operate in coordination with one or more separate annealing ovens to maximize the duty cycles of the systems 10.

The above-discussed control of the crystallization kinetics of the build material requires the build material to have a blend of one or more semi-crystalline polymers and one or more secondary materials, preferably amorphous polymer(s), that retard crystallization of the semi-crystalline polymer(s) and that are at least partially miscible (or more preferably, substantially miscible) with the semi-crystalline polymer(s).

Preferably the semi-crystalline polymer(s) and the secondary material(s) in the blend are separate compounds (e.g., separate polymers) that are homogenously blended. However, in alternative (or additional) embodiments, build material may include one or more copolymers having chain segments corresponding to the semi-crystalline polymer(s) and the secondary material(s), where the chain segments of the secondary material(s) retard the crystallization of the chain segments of the semi-crystalline polymeric material(s).

Polyamides

The build material can include a polyamide build material that compositionally includes a polyamide blend of one or more semi-crystalline polyamides, one or more amorphous polyamides, and optionally, one or more additives dispersed in the polyamide blend. The semi-crystalline polyamide(s) may include polyamide homopolymers and copolymers derived from monomers that include caprolactam, diamines in combination with monomers that include dicarboxylic acids, and mixtures thereof. The diamine monomers and the dicarboxylic acid monomers are each preferably aliphatic monomers, and more preferably are each acyclic aliphatic monomers.

However, in other embodiments, the diamine monomers and/or the dicarboxylic acid monomers may include aromatic or cycloaliphatic groups while maintaining crystalline domains. Furthermore, in some embodiments, the semi-crystalline polyamide(s) may include cyclic groups in grafted pendant chains (e.g., maleated groups), as discussed below. Preferred polyamide homopolymers and copolymers for the semi-crystalline polyamide(s) may be represented by the following structural formulas:

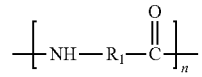
(Formula 1)

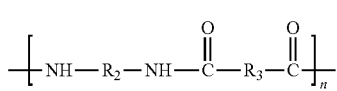
(Formula 2)

where $R_1$, $R_2$, and $R_3$ may each be a hydrocarbon chain having 3-12 carbon atoms. The hydrocarbon chains for $R_1$, $R_2$, and $R_3$ may be branched (e.g., having small alkyl groups, such as methyl groups) or unbranched, and which are preferably aliphatic, acyclic, saturated hydrocarbon chains.

As used herein, reference to a repeating unit identifier "n" in a polymer structural formula means that the bracketed formula repeats for n units, where n is a whole number that may vary depending on the molecular weight of the given polymer. Furthermore, the particular structures of the bracketed formulas may be the same between the repeating units (i.e., a homopolymer) or may be vary between the repeating units (i.e., copolymer). For example, in the above-shown Formula 1, $R_1$ may be the same structure for each repeating unit to provide a homopolymer, or maybe two or more different structures that repeat in an alternating copolymer manner, a random copolymer manner, a block copolymer manner, a graft copolymer manner (as discussed below), or combinations thereof.

Preferred polyamides for the semi-crystalline polyamide(s) include nylon-type materials such as polycarpolactum (PA6), polyhexamethyleneaidpamide (PA6,6), polyhexamethylenenonamide (PA6,9), polyhexamethylenesebacamide (PA6,10), polyenantholactum (PA7), polyundecanolactum (PA11), polylaurolactam (PA12), and mixtures thereof. More preferably, the polyamides for the semi-crystalline polyamide(s) include PA6; PA6,6; and mixtures thereof. Examples of suitable semi-crystalline polyamide(s) having aromatic groups include semi-crystalline polyamides of aliphatic diamines and isophthalic acid and/or terephthalic acid (e.g., semi-crystalline polyphthalamides).

It has been discovered that the use of polyhexamethyleneaidpamide (PA6,6) provides a stronger and higher temperature semi-crystalline build material that both PA12 and PA 6, while costing significantly less than PA12. The PA6,6 can be blended with amorphous Nylon 6-3T to boost the amorphous phase $T_g$ and moderate or retard the rate of crystallization. Impact modifier, nucleating agents, stabilizers and fibrous fillers such as, but not limited to glass fibers or carbon fibers can be added to selectively improve the properties of the alloy. It should be noted that PA6,10 is a probable semi-crystalline build material material for SLS applications, as PA6,10 has low moisture absorption and a lower operating window that can be achieved in current SLS units.

Figure 6:
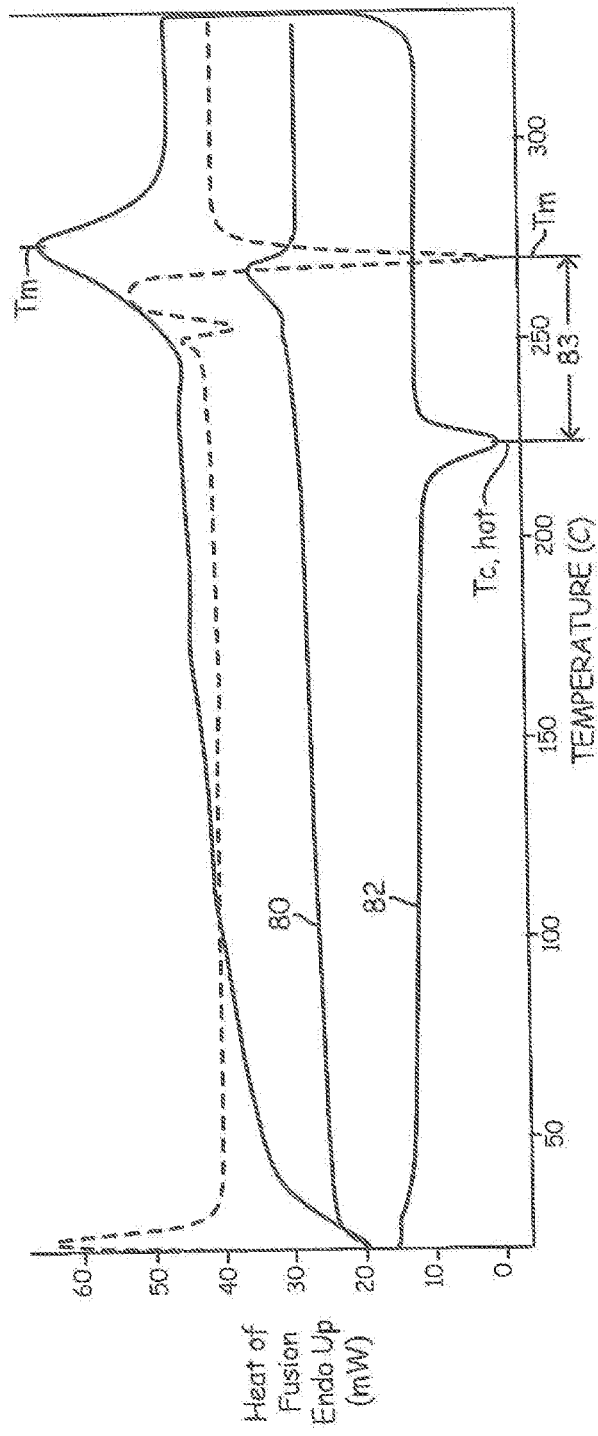
FIG. 6 is an illustrative DSC plot of heat flow versus temperature for PA6,6.
Figure 7:
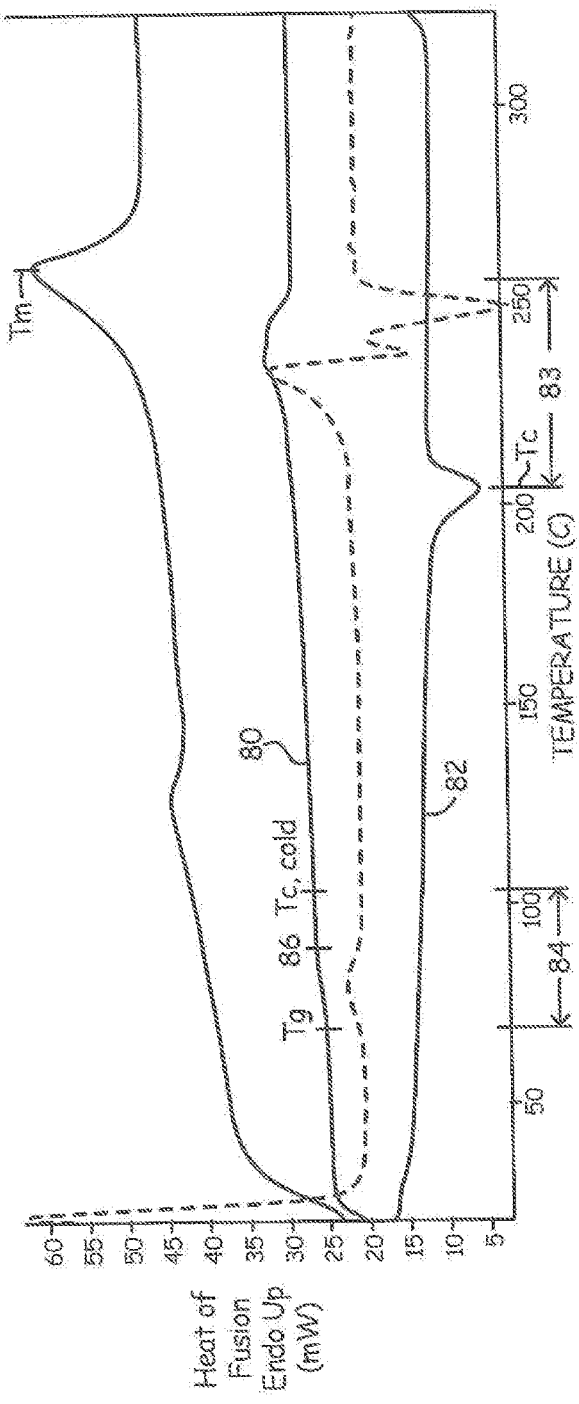
FIG. 7 is an illustrative DSC plot of heat flow versus temperature for PA6,6 base material of FIG. 6 modified with 25 wt. % PA 6-3T.
Figure 8:
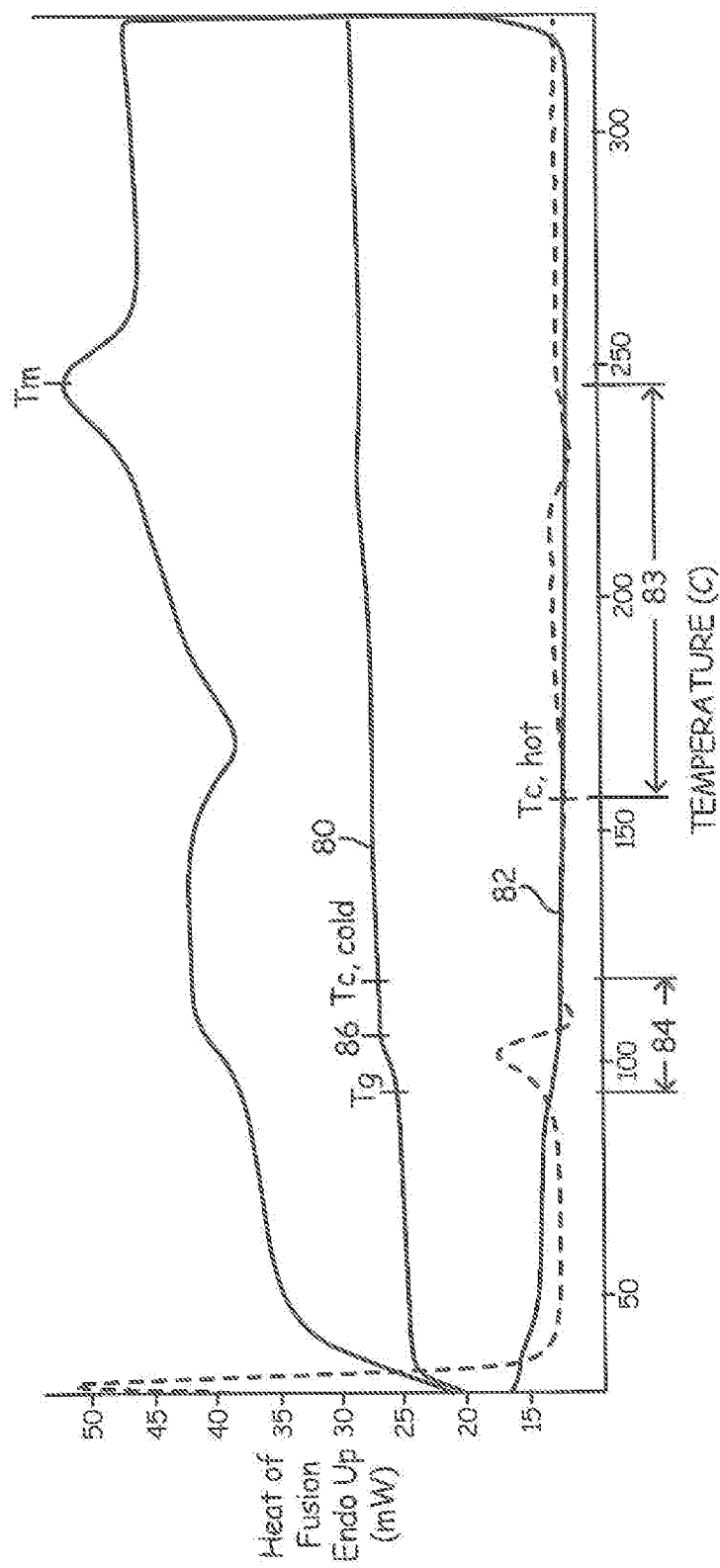
FIG. 8 is an illustrative DSC plot of heat flow versus temperature for the PA6,6 base material of FIG. 6 modified with 50 wt. % PA 6-3T.

A DSC trace of PA6,6 is illustrated in FIG. 6. When 25 wt. % of PA 6-3R is added to the PA6,6 a 15° C. decrease in the recrystallization temperature is realized as illustrated in FIG. 7. Referring to FIG. 8, the PA6-3T wt. % was increased to about 50 wt. % with about 50 wt. % of the PA6,6 which resulted a near elimination of the crystallinity of the alloy. FIGS. 6-8 illustrate that the manipulation of the secondary compounds can effectively retard or control the rate of the crystallization kinetics. Furthermore, in some embodiments, at least a portion of the semi-crystalline polyamide(s) are graft semi-crystalline polyamide(s), each having a polyamide backbone and one or more impact modifiers grafted to the backbone. The impact modifiers may include polyolefin-chain monomers and/or elastomers having coupling groups configured to graft the monomers to the polyamide backbone. Suitable coupling groups for the impact modifiers include piperidine groups, acrylic/methacrylic acid groups, maleic anhydride groups, epoxy groups.

Preferred coupling groups include maleic anhydride groups and epoxy groups, such as those respectively represented by the following structural formulas:

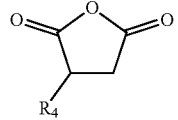
(Formula 3)

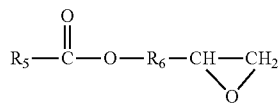
(Formula 4)

where $R_4$ and $R_5$ may each be a hydrocarbon chain having 2-20 carbon atoms, and more preferably 2-10 carbon atoms; and where $R_6$ may be a hydrocarbon chain having 1-4 carbon atoms. The hydrocarbon chains of $R_4$, $R_5$, and R6 may each be branched or unbranched. For example, preferred impact modifiers include maleated polyethylenes, maleated polypropylenes, and mixtures thereof. In embodiments in which the impact modifier includes an elastomer, preferred impact modifiers include maleated ethylene propylene diene monomers (EPDM).

Examples of suitable commercial impact modifiers include those available under the tradenames LOTADER from Arkema Inc., Philadelphia, Pa.; those under the tradename ELVALOY PTW, FUSABOND N Series, and NUCREL from E. I. du Pont de Nemours and Company, Wilmington, Del.; and those under the tradename ROYALTURF from Chemtura Corporation, Philadelphia, Pa. Examples of preferred graft semi-crystalline polyamides include those commercially available under the tradename ULTRAMID from BASF Corporation, Florham Park, N.J.; and those under the tradename GRILAMID from EMS-Chemie, Inc., Sumter, S.C. (business unit of EMS-Grivory).

The grafted impact modifiers may constitute from about 1% to about 20% by weight of the graft semi-crystalline polyamide(s). In some embodiments, the grafted impact modifiers constitute from about 5% to about 15% by weight of the graft semi-crystalline polyamide(s). In embodiments that incorporate the graft semi-crystalline polyamide(s), the graft semi-crystalline polyamide(s) may constitute from about 50% to 100% by weight of the semi-crystalline polyamide(s) in the build material, more preferably from about 80% to 100% by weight, and even more preferably from about 95% to 100% by weight. In some preferred embodiments, the semi-crystalline polyamide(s) of the PA material consist essentially of the graft semi-crystalline polyamide(s).

The semi-crystalline polyamide(s) preferably have a molecular weight range that renders them suitable for extrusion from print head 18, which may be characterized by their melt flow indices. Preferred melt flow indices for the semi-crystalline polyamide(s) range from about 1 gram/10 minutes to about 40 grams/10 minutes, more preferably from about 3 grams/10 minutes to about 20 grams/10 minutes, and even more preferably from about 5 grams/10 minutes to about 10 grams/10 minutes where the melt flow index, as used herein, is measured pursuant to ASTM D1238-10 with a 2.16 kilogram weight at a temperature of 260° C.

The PA material also compositionally includes one or more amorphous polyamides that are preferably miscible with the semi-crystalline polyamide(s). The amorphous polyamide(s) may include polyamide homopolymers and copolymers derived from monomers that include diamines in combination with monomers that include dicarboxylic acids, which are preferably cycloaliphatic and/or aromatic monomers. However, in other embodiments, the diamine monomers and/or the dicarboxylic acid monomers may include aliphatic groups (e.g., acyclic aliphatic groups) while maintaining amorphous properties.

Preferred polyamide homopolymers and copolymers for the amorphous polyamide(s) may be represented by the following structural formulas:

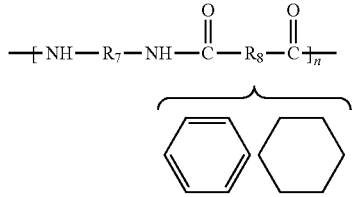
(Formula 5)

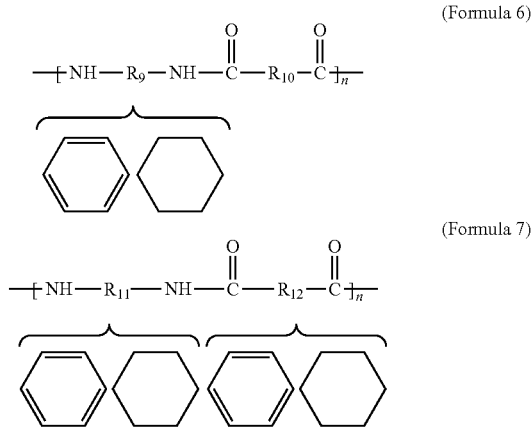

where $R_7$ and $R_{10}$ may each be a hydrocarbon chain having 3-12 carbon atoms. The hydrocarbon chains for $R_7$ and $R_{10}$ may be branched (e.g., having small alkyl groups, such as methyl groups) or unbranched, and which are preferably aliphatic, acyclic, saturated hydrocarbon chains. In comparison, $R_8$, $R_9$, $R_{11}$, and $R_n$ may each be a hydrocarbon chain having 5-20 carbon atoms, which may be branched (e.g., having alkyl groups, such as methyl groups) or unbranched, and each of which includes one or more aromatic groups (e.g., benzene groups), one or more cycloaliphatic groups (e.g., cyclohexane groups), or combinations thereof.

Preferred polyamides for the amorphous polyamide(s) include nylon-type materials such as polyamides of hexamethylenediamine, isophthalic acid, terephthalic acid, and adipic acid (PA6i/6T); polyamides of PA12; 3,3-dimethyl-4,4-diaminodicyclohexylmethane, and isophthalic acid (PA12/MACMI); polyamides of PA12; 3,3-dimethyl-4,4-diaminodicyclohexylmethane, and terephthalic acid (PA12/MACMT); (PA12/MACMI/MACMT); PA6i; PA12/MACM36; PANDT/INDT; polyamides of trimethylhexamethylenediamine and terephthalic acid (PA6/3T); polyamides of cycloaliphaticdiamine and dodecanedioic acid; amorphous polyamides of aliphatic diamines and isophthalic acid and/or terephthalic acid (e.g., amorphous polyphthalamides); and mixtures thereof. More preferably, the polyamides for the amorphous polyamide(s) include PA6/3T, polyamides of cycloaliphaticdiamine and dodecanedioic acid, and mixtures thereof.

It is contemplated that 2,4,4 trimethyl diacid can be polymerized with PA6,10 to product a polymer that would have a high melting portion and a hindered recrystallization rate and temperature. The irregularity of the 2,4,4 methyl groups hinders the ability of the PA6,10 to form crystallites because the 2,4,4 trimethyl diacid displaces the ability for intermolecular and intramolecular bonding to occur. Adding 2,4,4 trimethyl diacid monomer to the PA6,10 will hinder the ability of the polymer to form crystallites. However, the crystallites that do form will have the same level of energy needed to debind or break the intermolecular and intramoleular boding and obtain flow.

In some embodiments, at least a portion of the amorphous polyamide(s) may be graft amorphous polyamide(s), each having a polyamide backbone and one or more impact modifiers grafted to the backbone. Preferred impact modifiers for grafting to the amorphous polyamide(s) include those discussed above for the graft semi-crystalline polyamide(s), such as polyolefin-chain monomers and/or elastomers having coupling groups configured to graft the monomers to the polyamide backbone (e.g., piperidine groups, acrylic/methacrylic acid groups, maleic anhydride groups, and epoxy groups). Suitable concentrations of the grafted impact modifiers in the graft amorphous polyamide(s), and suitable concentrations of the graft amorphous polyamides relative to the entirety of amorphous polyamide(s) in the build material include those discussed above for the graft semi-crystalline polyamide(s).

Preferred concentrations of the amorphous polyamide(s) in the polyamide blend range from about 30% to about 70% by weight, more preferably from about 40% to about 60% by weight, and even more preferably from about 45% to about 55% by weight, where the semi-crystalline polyamide(s) constitute the remainder of the polyamide blend for use in extrusion based devices, EP and cooled SLS. Accordingly, preferred ratios of the amorphous polyamide(s) to the semi-crystalline polyamide(s) range from about 3:7 to about 7:3, more preferably from about 4:6 to about 6:4, and even more preferably from about 4.5:5.5: to about 5.5:4.5. Preferred concentrations of the amorphous polyamide(s) in the polyamide blend range from about 5% to about 20% by weight and about 80% to about 95% by weight of the semi-crystalline polyamide when used in SLS or hot HSS devices.

Polysulfones

The build material can also compositionally include a substantially miscible blend of one or more polyphenylsulfones (PPSU), polysulfones (PSU), and/or polyethersulfones (PES), with one or more semi-crystalline polyaryletherketones. Preferred concentrations of the polyphenylsulfone(s)/polysulfone(s)/polyethersulfone(s) in this blend range from about 1% by weight to about 65% by weight, and more preferably from about 20% by weight to about 50% by weight, where the polyaryletherketone(s) or amorphous glycol-modified polyethylene terephthalates (PET) constitute the remainder of the blend. The concentrations of the semi-crystalline polymer and the amorphous, miscible polymers or irregular monomers will be dependent upon the type of additive manufacturing process utilized.

Polycarbonates/Polyesters

The build material can also include includes a substantially miscible blend of one or more polycarbonates and one or more semi-crystalline polyesters, such as polybutylene terephthalates (PBT) and/or one or more semi-crystalline polyethylene terephthalates (PET). Preferred concentrations of the polycarbonate(s) in this blend range from about 30% by weight to about 90% by weight, and more preferably from about 50% by weight to about 70% by weight, where the polybutylene terephthalate(s)/polyethylene terephthalate(s) constitute the remainder of the blend.

The build material can also include a substantially miscible blend of one or more amorphous polyethylene terephthalates (e.g., glycol-modified polyethylene terephthalates) and one or more semi-crystalline polyethylene terephthalates. Concentrations of the amorphous polyethylene terephthalate(s) in this blend range from about 10% by weight to about 40% by weight, and more typically from about 15% by weight to about 25% by weight, where the semi-crystalline polyethylene terephthalate(s) constitute the remainder of the blend.

An advantage of utilizing PET in the alloy is that PET is relatively insensitive to moisture, acids and solvents in a solid state. Further, PET has a high modulus and strength or toughness. When reinforced with for instance carbon or glass fiber, the alloy is heat resistant to over 200° C. PET is also widely available, relatively inexpensive and also recyclable.

Relative to items built with amorphous materials using FDM techniques, unfilled PET formulations have shown superior toughness and elongation by over 25% while still exhibiting superior strength in a direction normal to a build plane (z-direction). Carbon reinforced PET materials where the carbon fibers are chopped into very small pieces have exhibited strengths over 15 ksi and moduli over 25 Msi as FDM items. Heat deflection temperatures can exceed 165° C. at 263 psi after annealing.

Figure 9:
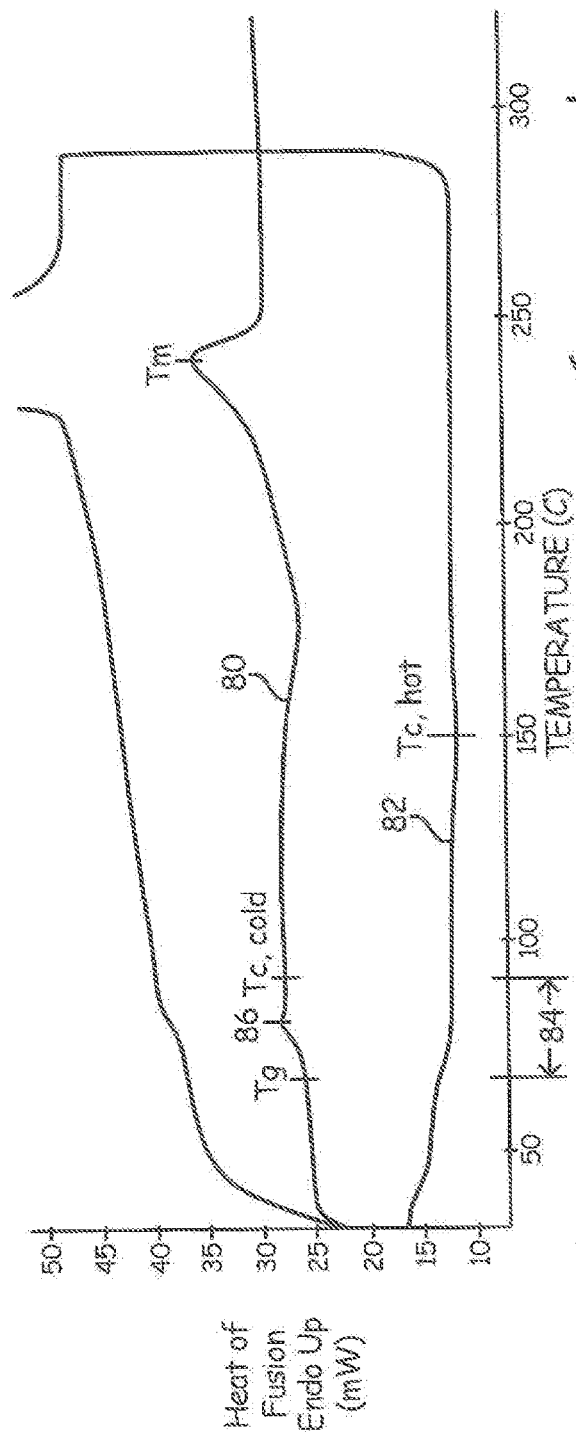
FIG. 9 is an illustrative DSC plot of heat flow versus temperature for a base co-polyester.
Figure 10:
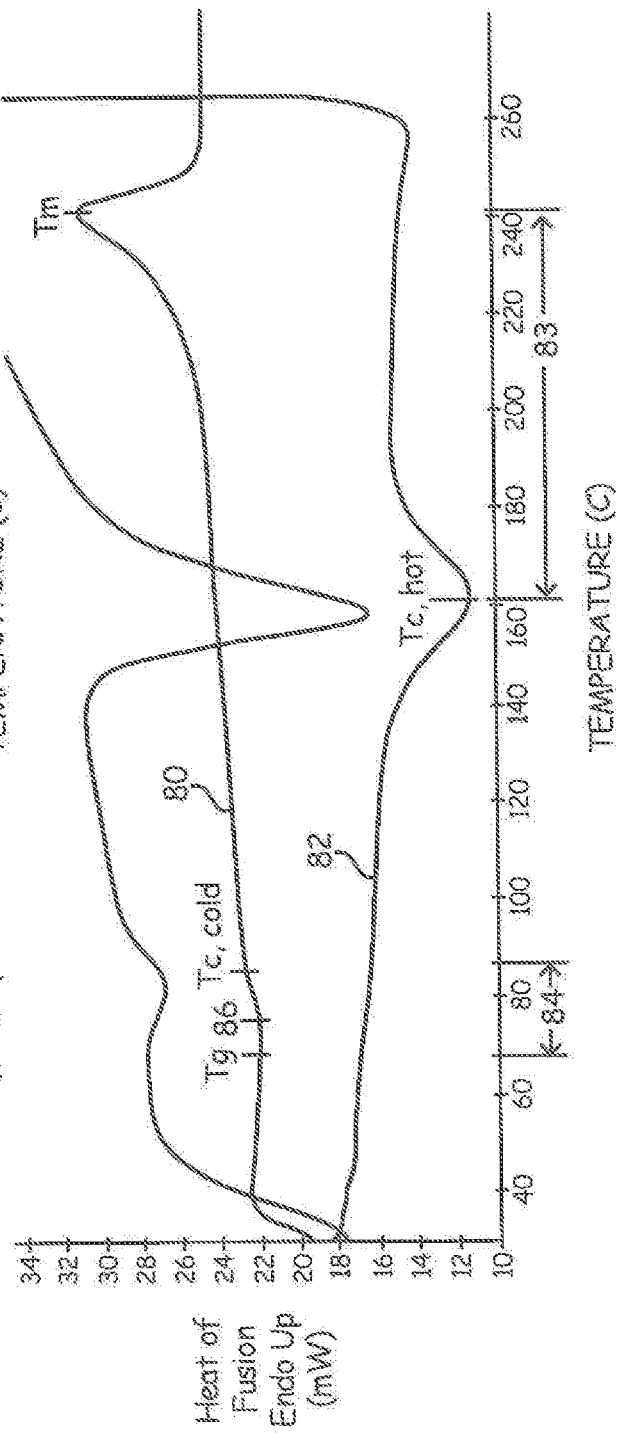
FIG. 10 is an illustrative DSC plot of heat flow versus temperature for the base co-polyester of FIG. 9 modified with 10 wt. % PETG.
Figure 11:
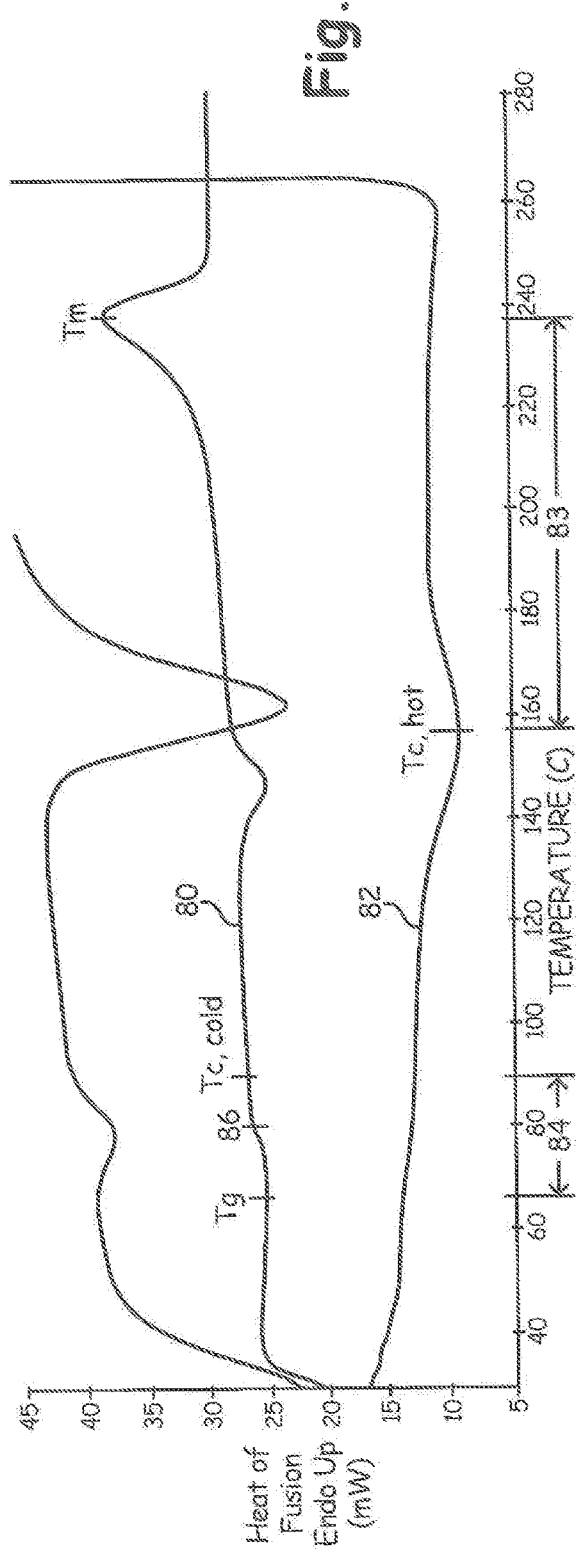
FIG. 11 is an illustrative DSC plot of heat flow versus temperature for the base co-polyester of FIG. 9 modified with 20 wt. % PETG.
Figure 12:
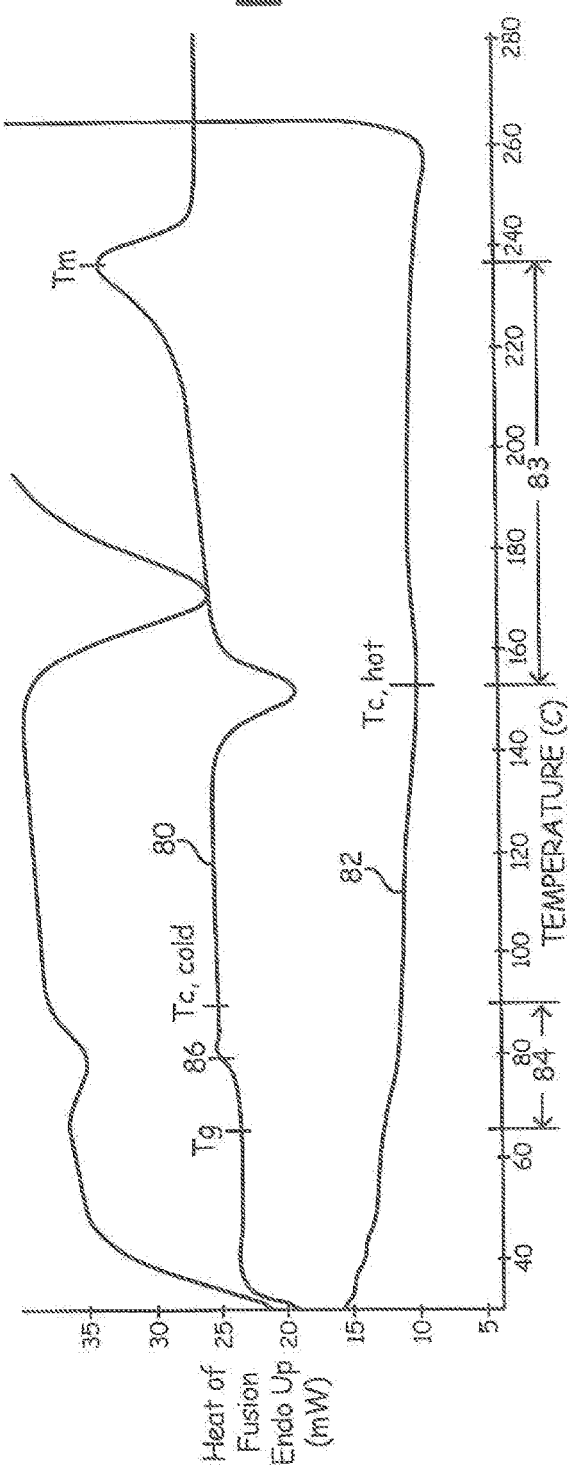
FIG. 12 is an illustrative DSC plot of heat flow versus temperature for the base co-polyester of FIG. 9 modified with 30 wt. % PETG.

For example, referring to FIGS. 9-12, the effects of utilizing PETG with a base co-polyester are illustrated. FIG. 9 is a DSC trace for the base co-polyester (WHAT IS THE CO-POLYESTER). In FIG. 10 the base co-polyester was modified by the addition of an impact modifier and 10 wt. % PETG, which resulted in a modification in $T_g$, $T_{c,cold}$, $T_m$ and the $T_{c,hot}$. At 20 wt. % PETG in FIG. 11 and 30 wt. % PETG further modification and manipulation of the $T_g$, $T_{c,cold}$, $T_m$ and the $T_{c,hot}$ occurred such that the process windows for both FDM and EP processes as well as SLS and HSS process can be manipulated and the rate of crystallization can be controlled.

Figure 13:
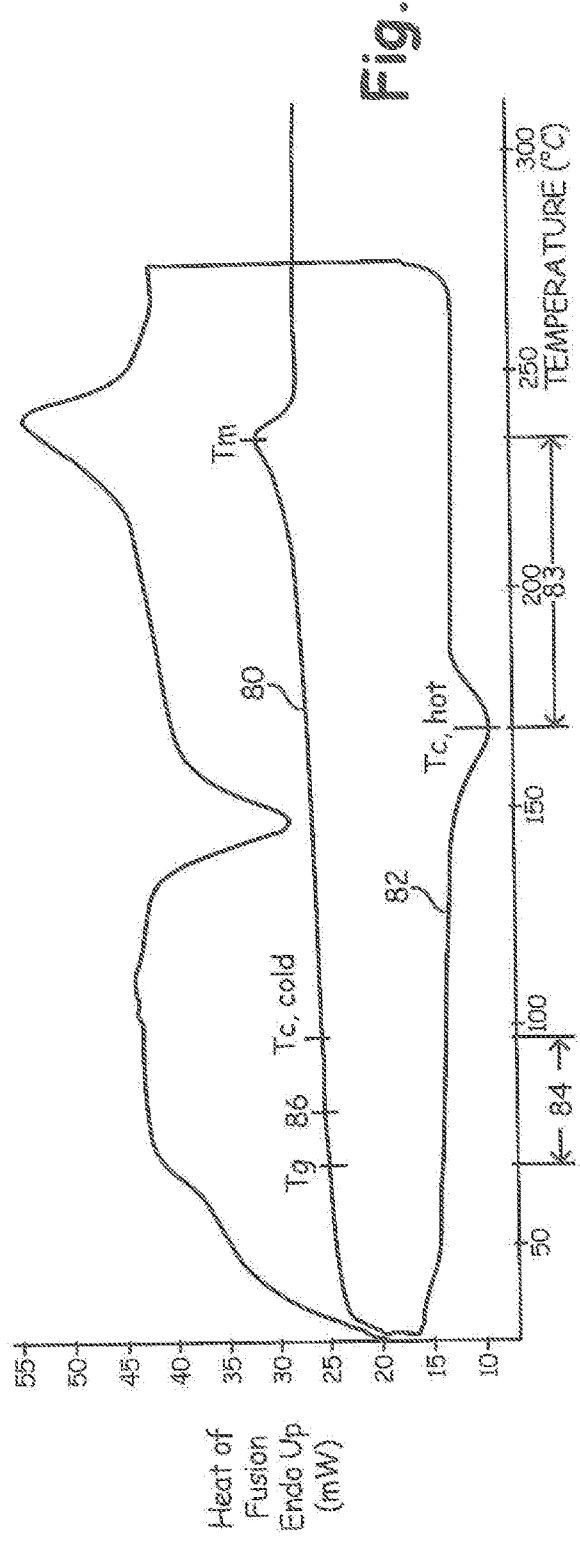
FIG. 13 is an illustrative DSC plot of heat flow versus temperature for the base co-polyester of FIG. 9 modified with 15 wt. % PETG and 30 wt. % carbon fiber.
Figure 14:
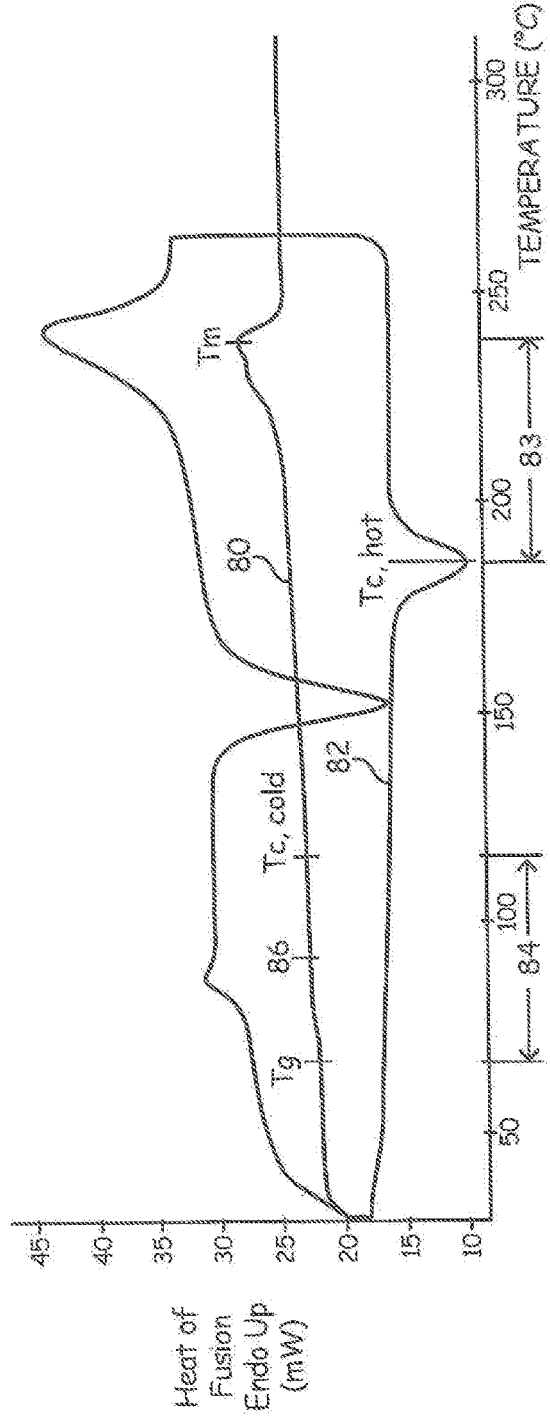
FIG. 14 is an illustrative DSC plot of heat flow versus temperature for the base co-polyester of FIG. 9 modified with 10 wt. % PETG and 40 wt. % carbon fiber.

Referring to FIG. 13, 30 wt. % carbon fiber was added to the co-polyester along with 15 wt. % PETG while in FIG. 14, 40 wt. % carbon fiber was added to the co-polyester along with 10 wt. % PETG. Again the modifications to the formation of the semi-crystalline co-polyester with an amorphous and miscible secondary polymer such as PETG along with the carbon fiber can be utilized to control the crystallization kinetics and manipulate the process windows for both FDM and EP processes as well as SLS and HSS processes.

Ketones

The build material can also compositionally include a substantially miscible blend of one or more polyetherimides (PEI) and one or more semi-crystalline polyaryletherketones (PAEK), such as one or more polyetherketones (PEK), polyetheretherketones (PEEK), polyetherketoneketones (PEKK), polyetheretherketoneketones (PEEKK), polyetherketoneether-ketoneketones (PEKEKK), mixtures thereof, and the like, and more preferably one or more polyetheretherketones (PEEK). Preferred concentrations of the polyaryletherketone(s) in this blend range from about 35% by weight to about 99% by weight, and more preferably from about 50% by weight to about 90% by weight, and even more preferably form about 60% by weight to about 80% by weight, where the polyetherimide(s) constitute the remainder of the blend.

The build material can also include a substantially miscible blend of one or more amorphous polyaryletherketones and one or more semi-crystalline polyaryletherketones, such as one or more amorphous polyetherketoneketones (PEKK) and one or more semi-crystalline polyetherketoneketones (PEKK). Concentrations of the amorphous polyaryletherketones(s) in this blend range from about 30% by weight to about 90% by weight, and more typically from about 50% by weight to about 70% by weight, where the semi-crystalline polyaryletherketones(s) constitute the remainder of the blend.

In some build material compositions, the build material may also include additional additives, such as colorants, fillers, plasticizers, impact modifiers, and combinations thereof. In embodiments that include colorants, preferred concentrations of the colorants in the build material range from about 0.1% to about 5% by weight. Suitable colorants include titanium dioxide, barium sulfate, carbon black, and iron oxide, and may also include organic dyes and pigments.

In build material compositions that include fillers, concentrations of the fillers in the build material range from about 1% to about 45% by weight for some fillers (e.g., glass and carbon fillers), and up to about 80% by weight for other fillers, such as metallic and ceramic fillers. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, metals, ceramics, and combinations thereof.

In the build material compositions including the above-discussed additional additives, the polymer blend preferably constitutes the remainder of the build material. As such, the polymer blend may constitute from about 55% to 100% by weight of the build material, and more preferably from about 75% to 100% by weight. In some embodiments, the polymer blend constitutes from about 90% to 100% by weight of the build material, more preferably from about 95% to 100% by weight. In further embodiments, the build material consists essentially of the polymer blend, and optionally, one or more colorants and/or anti-oxidants and/or heat absorbing materials which typically are utilized with EP, SLS and HSS techniques.

In particular PEKK is a useful semi-crystalline polyaryletherketones PAEK relative to PEEK and PEK because PEKK has a higher $T_g$ and improved thermo-oxidative stability relative to PEEK. Further, PEKK has excellent chemical resistance and high strength and stiffness, even without reinforcement additives.

Figure 15:
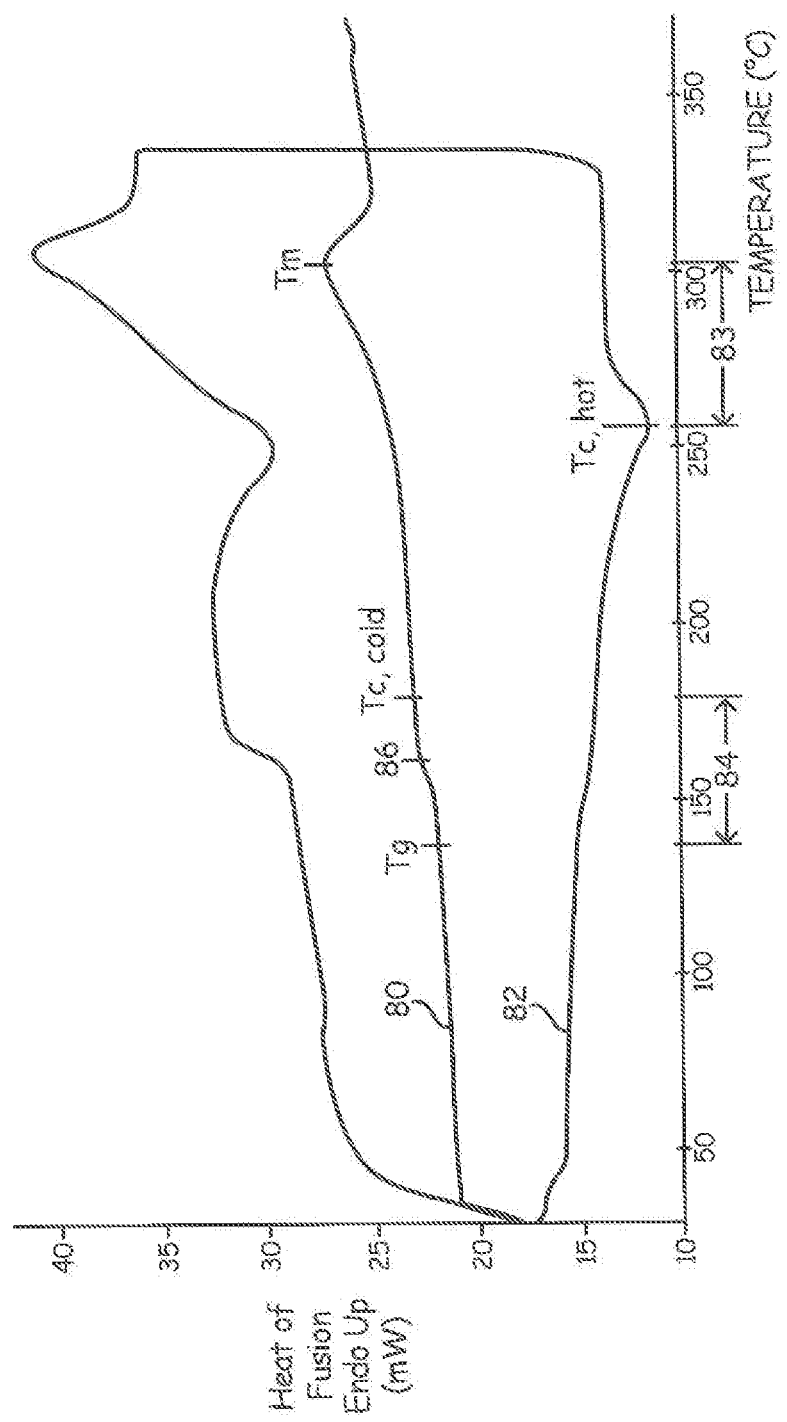
FIG. 15 is an illustrative DSC plot of heat flow versus temperature for a PEKK base material.

When formulating a PEKK semi-crystalline build material, PEKK co-polymers of differing T/I ratios and viscosities can be blended to achieve balances between toughness, crystallinity and thermal capabilities. Stabilizers and fibrous fillers including, but not limited to, glass and carbon can be added to improve physical properties while inorganic agents can be added to manipulate the crystallinity of the build material. Exemplary inorganic agents include titanium dioxide, talc, mica, boron nitrate (BN), calcium carbonate, phosphates, sulfates, salts and combinations thereof. Referring to FIG. 15, PEKK sold by Arkema Inc. located in Phillidephia, Pa. under the Kepstan® 6003 designation was utilized with BN as a nucleator. As illustrated, an HHS system could print items in the $T_g$ to the $T_{c,hot}$ range. However, an item using the same formulation could not be printed with an SLS technique because the energy required to melt the polymer with a laser would burn the material. HSS techniques allow for the modification of the temperature profile to be more gradual, then followed by a rapid cooling to the recited range.

Figure 16:
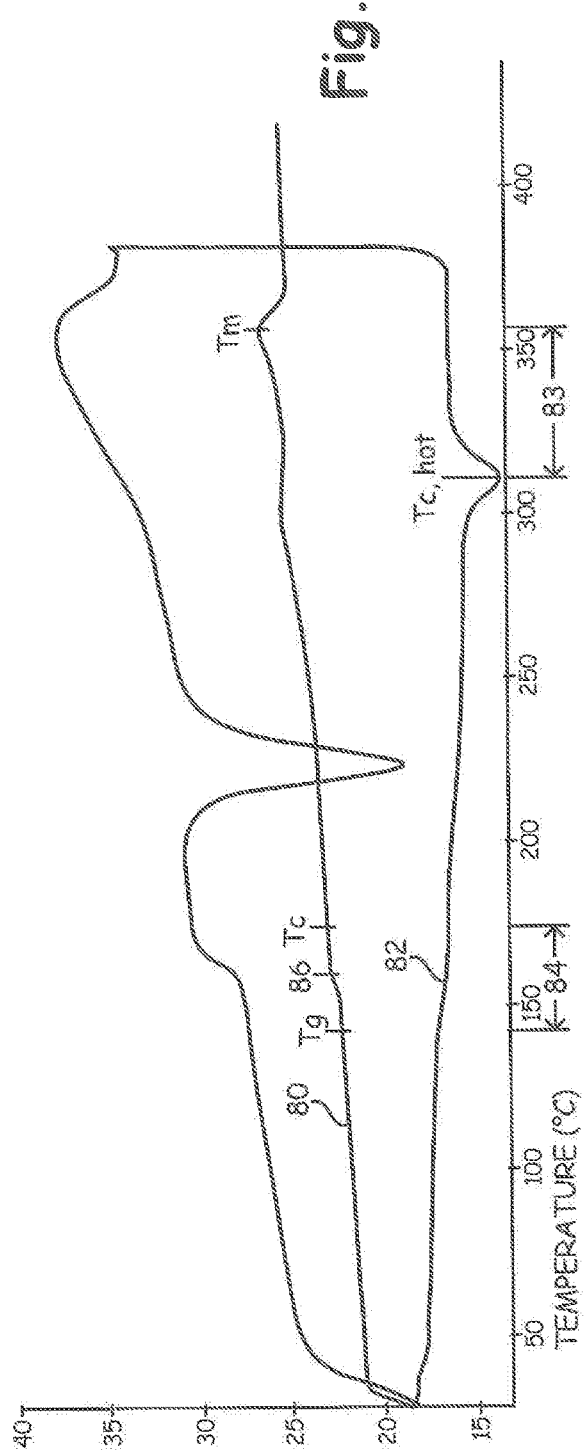
FIG. 16 is an illustrative DSC plot of heat flow versus temperature for the PEKK base material of FIG. 15 modified with another PEKK material at a ratio of 2:1.
Figure 17:
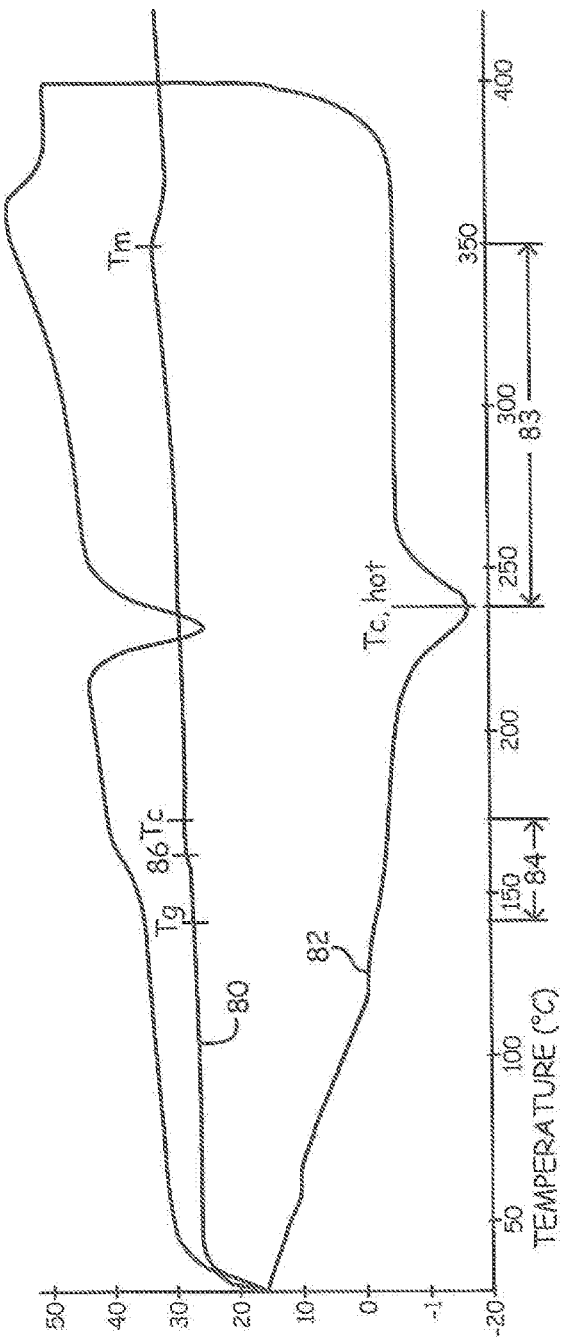
FIG. 17 is an illustrative DSC plot of heat flow versus temperature for the PEKK base material of FIG. 15 modified with another PEKK material at a ratio of 3:2.

Referring to FIGS. 16 and 17, an alloy of Kapstan® 6000 and 8000 designation manufactured by Arkema was blended with 2 parts of Kapstan® 6000 to one part Kapstan® 8000 with BN utilized as a nucleator. FIGS. 16 and 17 illustrate that this alloy could potentially be utilized at about 325° C. which is above the lower melting point of the polymer, provided the crystallite is in the proper ratio.

All of the above mentioned polymer blends are also substantially homogenous, allowing each portion of the build material used in an additive manufacturing system to consistently exhibit the same thermal and physical properties. As such, if the polymer blend were otherwise non-homogenous, the build material would not be uniform.

Additionally, a non-homogenous blend may result in imbalances in the crystallization kinetics of the build material, which could reduce the above-discussed benefits of controlling the crystallization kinetics. Further, non-miscible alloys are only strong as the interfacial adhesion between the two phases in the Z-axis meaning that non-miscible alloys are weak in the Z-direction. As such, miscible alloys or copolymers with controlled crystalline kinetics are desired. Accordingly, feed stock of the build material is preferably manufactured from a build material having a substantially homogenous polymer blend of the semi-crystalline polymer(s) and the secondary material. In embodiments that include one or more additives, the additive(s) are preferably dispersed in the polymer blend in a substantially uniform manner.

As mentioned above, the above-discussed method may also be utilized with electrophotography-based additive manufacturing systems, selective laser sintering systems and high speed sintering systems. With respect to electrophotography-based additive manufacturing systems, the build material may be provided in powder form for use in an electrophotography-based additive manufacturing system, such as those disclosed in Hanson et al., U.S. Publication Nos. 2013/0077996 and 2013/0077997, and Comb et al., U.S. Publication Nos. 2013/0186549 and 2013/0186558, the disclosures of which are incorporated by reference to the extent that they do not conflict with the present disclosure.

As discussed in these references, the electrophotography-based additive manufacturing systems preferably operate with layer transfusion assemblies that transfuse each successively-developed layer based on interlayer polymer entanglement (i.e., reptation). As such, the above-discussed method for controlling the crystallization kinetics of the build material for the extrusion-based additive manufacturing systems may also be used in the same manner with the electrophotography-based additive manufacturing systems.

In comparison, however, SLS and HSS systems may print 3D items in which is held in a gelatinous, undercooled amorphous state between the hot melting temperature and the hot crystallization temperature of the nylon material. However, many semi-crystalline materials, such as nylon materials, typically have small temperature windows between their melting temperatures and the hot crystallization temperatures, rendering it difficult to hold the printed layers in this amorphous state after being melted with a laser beam.

As discussed above, it has been found that the substantially miscible blends for the build material of the present disclosure decrease the hot crystallization temperature $T_{c,hot}$ of the build material from that of the semi-crystalline polymer(s). Conversely, the melting temperature $T_m$ of the build material remains substantially unchanged. As such, the substantially miscible blend for the build material widens the operating window, referred to as operating window 83 in FIGS. 4 and 5, in which the printed layers may be held in the gelatinous, undercooled amorphous state to prevent warping and distortions. In this case, the powder materials may be selectively melted with the laser beam and held within this operating window 83 until the printing operation is completed. The whole 3D item 30 may then be cooled down in a conventional manner.

In embodiments involving the above-discussed technique used in a selective laser sintering system (e.g., systems disclosed in Deckard, U.S. Pat. Nos. 4,863,538 and 5,132,143), the build material may be provided in powder form for use in other powder-based additive manufacturing systems. In some alternative embodiments, such as with some polyamide materials (e.g., glass-filled PA6/10 materials), this technique may also be utilized in extrusion-based and/or electrophotography-based additive manufacturing systems. This can accordingly produce 3D items having high heat deflection temperatures, which can be beneficial for use with soluble support materials.

HHS systems operate in a similar manner as SLS systems. However, heat is supplied to the material through radiation on thermal sources such as infrared(IR) heat, HHS devices and methods are disclosed in Hopkinson U.S. Pat. No. 7,879,282.

Figure 18:
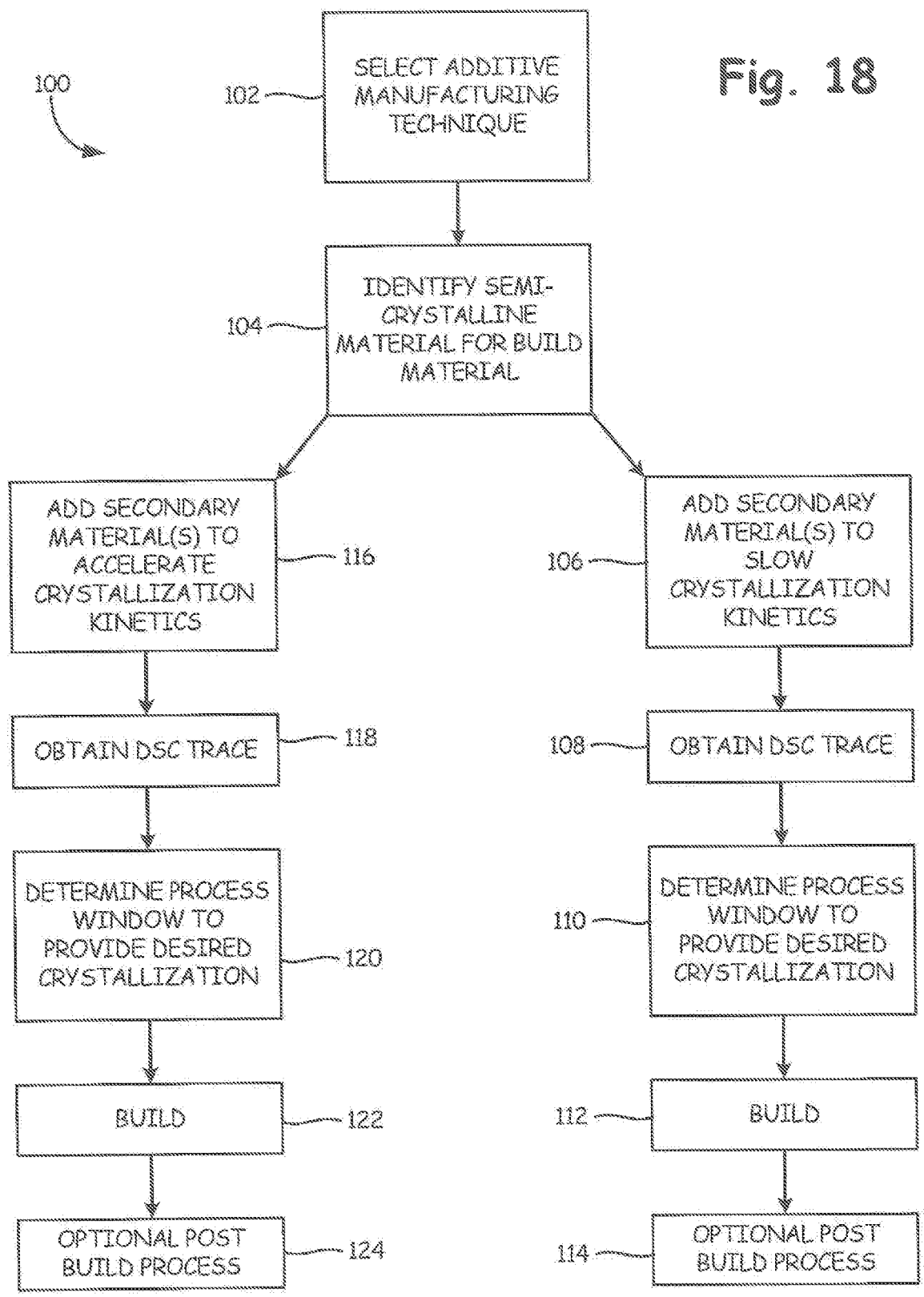
FIG. 18 is a flow chart of the disclosed method for control the kinetics of crystallization for semi-crystalline polymers.

Referring to FIG. 18, the method of the present disclosure is illustrated at 100. In step 102, the technique used for additive manufacturing is selected. A non-exhaustive list of techniques includes extrusion based techniques, such as FDM, BAAM and OOO; EP, SLS and HSS.

At step 104, the semi-crystalline material to be utilized to build the item is identified and the crystallization kinetics of the semi-crystalline material is identified. In the event that the crystallization kinetics require modification such that the heat of fusion is between about 2 J/g heat of fusion and about 80% of the heat of fusion of a build material that is compositionally about 100% of the semi-crystalline build material, as measured by differential scanning calorimetry (DSC) when cooling from the melting temperature to the hot crystalline temperature at a rate of 10° C./min, a decision is required to either retard or accelerate the crystallization kinetics to utilize a build material that is within the identified heat of fusion range. The determination of whether to accelerate or retard the crystallization kinetics can be determined by obtain a DSC trace from a solid form to a melt temperature and cooled back to a temperature through which the material crystallizes using the DSC technique as described herein. However, other measurements and testing techniques besides DSC can be used to determine the heat of fusion of a particular semi-crystalline material.

Upon determining that the crystallization kinetics required to be slowed or retarded, a secondary material is added producing a build material that maintains the heat of fusion in the above-disclosed range during crystallization at step 106. Typically, the secondary material can be a completely miscible, amorphous polymer to form the modified build material. Additionally, direct polymerization or selection of specially polymerized polymers, which are synthesized with disrupted structural regularity can be utilized. However, the present disclosure is not limited to the above-listed secondary materials.

At step 108, a DSC trace is obtained to determine the $T_g$, $T_{c,cold}$, $T_m$, and $T_{c,hot}$ on the modified build material. From the DSC trace on the modified semi-crystalline material, process conditions can be determined for extrusion based additive techniques, such as FDM, BAAM and OOO, and EP additive techniques by maintaining the material between approximately between about $T_g$ and about $T_{c,cold}$ and in the case of SLS or HSS the process conditions are maintained slightly below $T_m$, and about $T_{c,hot}$ in step 110. The amount of crystal formation in the build material is determined based upon the process conditions used, as the amount of crystal formation is on a continuum between the low temperature range and the high temperature range for both types of additive manufacturing techniques.

The item is then built in step 112 by the additive manufacturing technique identified in step 102. Optionally, post build processing steps can be conducted, including, but not limited to additional annealing in step 114.

Upon determining that the crystallization kinetics requires to be accelerated, a secondary material is added produce a build material that maintains the heat of fusion in the above-disclosed range during crystallization at step 116. Typically, the secondary material include the addition of micron-scale additives, such as synthetic fibers, minerals (natural or synthetic), or by the addition of one or more immiscible secondary polymers, which are finely dispersed as a discrete phase through compounding techniques common in polymer processing. However, the present disclosure is not limited to the above-listed secondary materials.

At step 118, a DSC trace is obtained under conditions described in step 108. From the DSC trace obtained in step 118, process conditions are identified in step 120 for a selected additive manufacturing technique described in step 110. The item is built in step 122 as described in step 112 and optional, post build processing steps can be conducted in step 124 as described in step 114.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Example 1

A series of items were using an FDM printing technique where a FORTUS 400MC machine manufactured by Stratasys, Inc. located in Eden Prairie, Minn. was utilized. The semi-crystalline build materials being tested in this Example included a co-polymer of poly(oxy-1,4-phenyleneoxy-1,4-phenylene carbonyl-1,4-phenylene) PEEK and the polyimide formed from 4,4'-(4,4'-isopropylidene-diphenoxy)bis (phthalic anhydride) and 1,3-phenylenediamine PEI.

The PEI is available commercially under the ULTEM® 1000 Resin series of polymers manufactured by SABIC Innovative Plastics located in Pittsfield, Mass. The PEEK is available under the KetaSpire® KT-880 resin series manufactured by Solvay Corporation located in Broxelles, Belgium or the Vitrex® series 90G PEEK polymer manufactured by Victrix USA, Inc. locatedin West Conshohocken, Pa.

The materials were compounded on a twin-screw extruder Model Number ZSE 18 mm lab compounder, manufactured by Leistritz Aktiengesellschaft located in Nuremberg, Germany at a temperature between 375° C. and 400° C. The formulations in Table 1 below were blended within 1% at the stated relative weight percentages as set forth in Table 1. After being compounded, the materials were extruded as strands, cooled and pelletized for further processing and analysis.

TABLE 1

| FORMULATION | wt % ULTEM | wt % KetaSpire KT-880 | wt % Carbon Fiber Filler |
|---|---|---|---|
| PEEK-PEI 40 | 40 | 60 | 0 |
| PEEK-PEI 60 | 60 | 40 | 0 |
| PEEK-PEI 70 | 70 | 30 | 0 |
| PEEK-PEI 70 CF25 | 49 | 21 | 30 |

The materials in Table 1 along with neat PEEK (KT-880) were subsequently tested using DSC on a Model Number DSC 6000 manufactured by PerkinsElmer, Inc. located in Waltham, Mass. The samples were heated 30° C./min until the melting temperature was obtained. The samples were then cooled at a rate of 10° C./min. The results of the DSC testing are set forth in Table 2, where all temperatures are in degrees Celsius. It is noted that the formulation designated PEEK-PEI 40 was reheated a second time and has data from the second run in parentheses.

TABLE 2

| | Tg 1st heat (2nd heat) | Tc, cold | Tmelt Onset | Tmelt peak | Tc, hot | Tcrys Onset | Delta Hf - Heat of fusion in J/g | % Delta Hf upon Cooling ref. Neat mat |
|---|---|---|---|---|---|---|---|---|
| Neat PEEK (KT-880) | 147 | — | 336 | 347 | 305 | 311 | 45 | 100% |
| PEEK-PEI 40 | 208 (185) | 252 | 320 | 335 | 279 | 289 | 21 | 46.7% |
| PEEK-PEI 60 | 175 | 239 | 326 | 339 | 286 | 292 | 29 | 64.4% |
| PEEK-PEI 70 | 163 | 223 | 327 | 340 | 290 | 295 | 33 | 73.3% |
| PEEK-PEI 70 CF25 | 159 | 225 | 329 | 341 | 291 | 300 | 32 | 71.1% |

The resulting formulations illustrate the compounding PEI with PEEK reduces the heat of fusion to between 46.7 and 71.1 and that there is a direct correlation between the amount of amorphous PEI added to the PEEK and the reduction the heat of fusion. It is also noted that the change in the heat of fusion is within the disclosed range as set forth above.

A series of "tee" bars were built using the FDM additive technique where a nominally dense (>90% fill) "tee" bar is built with a second, removable material support structure to test the curl of the disclosed formulations. After annealing the "tee" bars for an additional amount of time, such as more than 4 hours after the build, the "curl" of each sample was is measured at the extreme ends of the sample (corners), after removal of the support material and the sample is cooled to room temperature.

It should be noted that an acceptable level of curl is 1% over the length of the sample. Thus, for a 15 inch bar, a curl result of 15 mils or less is desired. Further, temperature gradients and build inaccuracies in R&D-scale materials and systems can lead to non-uniform results for one side of the bar vs. the other. The results of the "curl" test are set forth in Table 3, below.

TABLE 3

| Formulation | Environment Temp Set-Point [° C.]/Approx. Actual [° C.] | Right Side Curl [mil] | Left Side Curl [mil] |
|---|---|---|---|
| PEEK-PEI 40 | 225/210 | 14.5 | 9.0 |
| PEEK-PEI 70 CF25 | 225/210 | 6.5 | 4.5 |
| PEEK-PEI 70 CF25 | 190/180 | 15 | 18 |

The data in Table 3 illustrates that where dimensional accuracy is critical, a PAEK (PEEK-PEI) material with substantially reduced crystallinity is preferred, at least where larger parts and higher temperatures are involved. In the more crystalline sample, even with substantial fiber filler, it was determined that the higher oven (quench) temperature of 225° C. allows too much crystallinity (stress and shrinkage) to develop to meet acceptable curl standards. Thus, a lower oven temperature is preferred, as this will help to quench out an additional fraction of the potential crystallinity, thus reducing overall shrinkage, and giving better dimensional control in a formulation that consists substantially of PEEK.

The materials were then tested for out of build plane strength (z-strength) when build an item using the FDM build technique. The samples were built using single FDM beads/roads with aspect ratio (width to height) between 2:1 and 3:1. All samples were printed with a liquefier temperature between 390 and 420° C., and at an appropriate temperature to control curl in large parts. The exception is neat PEEK which was printed at 155° C. In all cases the layer Resolution was 10 mil. The results of this test are set forth in Table 4, below.

TABLE 4

| Material | Bead Width [mil] | Z-load [lbs-force] | Z-strength at Break [psi] | % Elongation at Break |
|---|---|---|---|---|
| PEEK - KT-880 * | * | * | * | * |
| Neat ULTEM 1010 | 22 | 52.3 | 9040 | 3.3 |
| PEEK-PEI 40 | 21 | 50.9 | 9550 | 3.7 |
| PEEK-PEI 60 | 20 | 38.43 | 7560 | 2.4 |
| PEEK-PEI 70 CF25 | 21 | 26.1 | 4800 | 2.4 |
| PEI CF25 | 27 | 24.1 | 3470 | 2.8 |

* An acceptable printed could not be printed in this Example for testing.

A major increase in Z-strength up to and over PEI by itself with the addition of 40% PEEK to PEI for predominantly PEEK alloys was observed. Further, it was observed that a reduction in the rapid crystallization inherent to PEEK alone has increased Z-strength significantly over the base PEEK, which could not successfully be built. For pure PEEK even in an environment kept at or below its $T_g$, the self-lamination strength is so weak that moderate stresses from differential shrinkage are enough to peel layers apart. It is believed this result occurs because PEEK crystallizes so fully and so rapidly that each subsequent layer of deposited material cannot input enough additional heat into the previous layer to fully re-melt all the crystallites and allow for meaningful interpenetration (diffusion/reptation) of polymer molecules.

Figure 19:
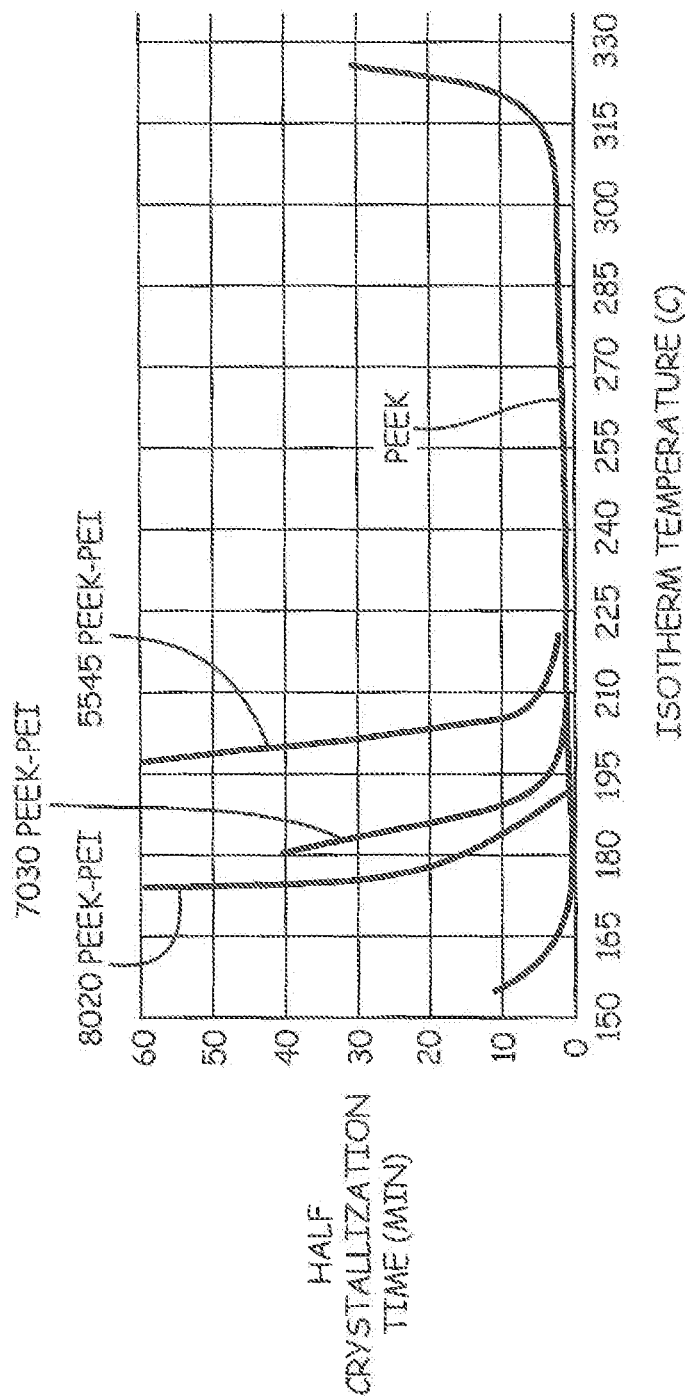
FIG. 19 is a graphical representation of the half-crystalline time versus temperature for several PEEK-PEI compositions.

The retardation of the crystallization of the build material, especially at low temperatures, is important for annealing parts to relieve stresses that lead to curl, in a semi-amorphous or pseudo-amorphous state in the FDM and/or EP additive techniques. FIG. 19 illustrates the crystallization half times, i.e. the time to reach a peak in the exotherm for recrystallization indicative of reaching approximately 50% of the material's full level of crystallinty. Each of the PEEK-PEI alloys were rapidly heated at a rate of 100° C./min to the isotherm temperature followed by a hold for up to 12 hours. PEEK data was obtained from the literature. It was observed that compounding PEEK with just 20% PEI has a marked effect on the crystallization behavior of PEEK. It is noted that the tested compositions in Example 1 are not exhaustive and that system optimization and "tuning" of build parameters can further enhance the positive effects, including solidification without excessive crystallization, leading to better layer to layer bonding, and the ability to tailor the crystallinity in the finished item by enlarging a post-process annealing window at a higher temperature than the build temperature.

Example 2

Example 2 illustrates that with some semi-crystalline build materials the crystallization kinetics are required to be accelerated to provide a suitable printed item. Acceleration of the crystallization kinetics can be advantageous when using polyetherketoneketone PEKK as a build material. PEKK is commercially available as a series of copolymers based on a chemistry in which "straight" co-monomers, i.e. 1,4 or para substituted moieties may be substituted for "kinked" co-monomers, i.e. 1,3 or meta substituted moieties which can be introduced carefully (and under manufacturer's proprietary techniques) to reduce the melting point of a purely 1,4 substituted material. A purely 1,4 phenylene polymerized polymer has a melting point near 400° C., which is also in a range where material viscosity becomes unstable, and thermal degradation begins to occur relatively rapidly. Thus, using such a technique to lower the polymer's melting point is useful. It is also useful in additive manufacturing processes, as a side effect of the copolymerization is a reduction in melting point, and also a reduction in recrystallization temperatures and crystallization rates, both upon heating and cooling.

In Example 2, the materials utilized are Solvay KetaSpire KT-880 PEEK as discussed in Example 1 and Kepstan® 5050 and 6003 and Kepstan® 8002 PEKKs all manufactured by Arkema Inc. located in Philadelphia Pa.

The materials were compounded on a twin-screw extruder Model Number ZSE 18 mm lab compounder, manufactured by Leistritz Aktiengesellschaft located in Nuremberg, Germany at a temperature between 375° C. and 400° C. The formulations in Table 5 below were blended within 1% at the stated relative weight percentages as set forth in Table 5. After being compounded, the materials were extruded as strands, cooled and pelletized for further processing and analysis.

TABLE 5

| Material | wt % PEEK | wt % PEKK 60 | wt % PEKK 80 |
|---|---|---|---|
| PEEK HF | 100 | — | — |
| PEKK 60 HF | — | 100 | — |
| PEKK 80 MF | — | — | 100 |
| PEKK 5050 | — | 50 | 50 |
| PEKK 6535 | — | 65 | 35 |

TABLE 5-continued

| Material | wt % PEEK | wt % PEKK 60 | wt % PEKK 80 |
|---|---|---|---|
| PEKK N1 | 1 | 99 | — |
| PEKK N3 | 5 | 95 | — |

The materials in Table 5 were subsequently tested using DSC on Model Number DSC 6000 manufactured by PerkinsElmer, Inc. located in Waltham, Mass. The samples were heated 30° C./min until the melting temperature was obtained. The samples were then cooled at a rate of 10° C./min. The results of the DSC testing are set forth in Table 6, where all temperatures are in degrees Celsius.

TABLE 6

| Material | Tg | FDM Oven +/− 10 C. | Tc, cold | Tmelt Onset | T melt PEAK | Tc, HOT | Tc, Onset | SLS Window | Delta Melt | T SLS | Delta Hf | % Delta Hf upon Cooling ref. Neat mat |
|---|---|---|---|---|---|---|---|---|---|---|---|---|
| PEEK HF | 147 | — | — | 336 | 347 | 305 | 311 | 15 | 31 | 326 | 45 | 100% |
| PEKK 60 HF | 158 | 160 | 220 | 300 | 307 | 220 | — | — | 80 | — | 1.5 | 3% |
| PEKK 80 MF | 160 | — | — | 340 | 360 | 299 | 309 | 21 | 41 | 327 | 51 | 100% |
| PEKK 5050 | 156 | 182 | 234 | 327 | 351 | 289 | 302 | 15 | 38 | 317 | 31 | 60.8% |
| PEKK 6535 | 157 | 187 | 246 | 309 | 345 | 279 | 294 | 5 | 30 | 304 | 22 | 43.1% |
| PEKK N1 | 156 | 189 | 254 | 285 | 305 | 230 | 265 | 10 | 55 | 278 | 1 | 2.0% |
| PEKK N3 | 156 | 181 | 230 | 267 | 301 | 235 | 262 | 0 | 32 | 267 | 17 | 33.3% |

The DSC results from Table 6 illustrate that it is possible to appreciably modify the crystallization behavior of pseudo-amorphous PEKK to achieve similar crystallinity reductions as in the PEEK-PEI alloys described in Example 1. In these cases, acceleration of the "slow" Kepstan 6003 is the desired result. One strategy involves the addition of a much more crystalline, and more rapidly crystallizing PEKK copolymer, Kepstan® 8002. In the 6535 and 5050 copolymers, it was observed that the addition of the Kepstan® 8002 PEKK can increase the relative crystallinity of a blend based on Kepstan® 6003 to between 43 and 61 percent of the enthalpy observed cooling at 10 C from the melt vs. the neat Kepstan® 8002 material.

Another strategy that can be employed to increase the crystallization rate and amount of the Kepstan® 6003 polymer was to introduce a less compatible polymer, such as, but not limited to, PEEK, which should crystallize more rapidly, and exist as a discrete phase that "precipitates from solution" upon cooling from the melt. The above DSC data shows that a 5% PEEK loading has increased the relative crystallinity of a PEKK copolymer from 3% to as much as 30%. The relatively low result in the 1% PEEK alloy may be due to the low loading level, incomplete mixing, or a slight degree of miscibility between the two polymers that necessitates adding much higher levels to achieve appreciable effects.

Figure 20:
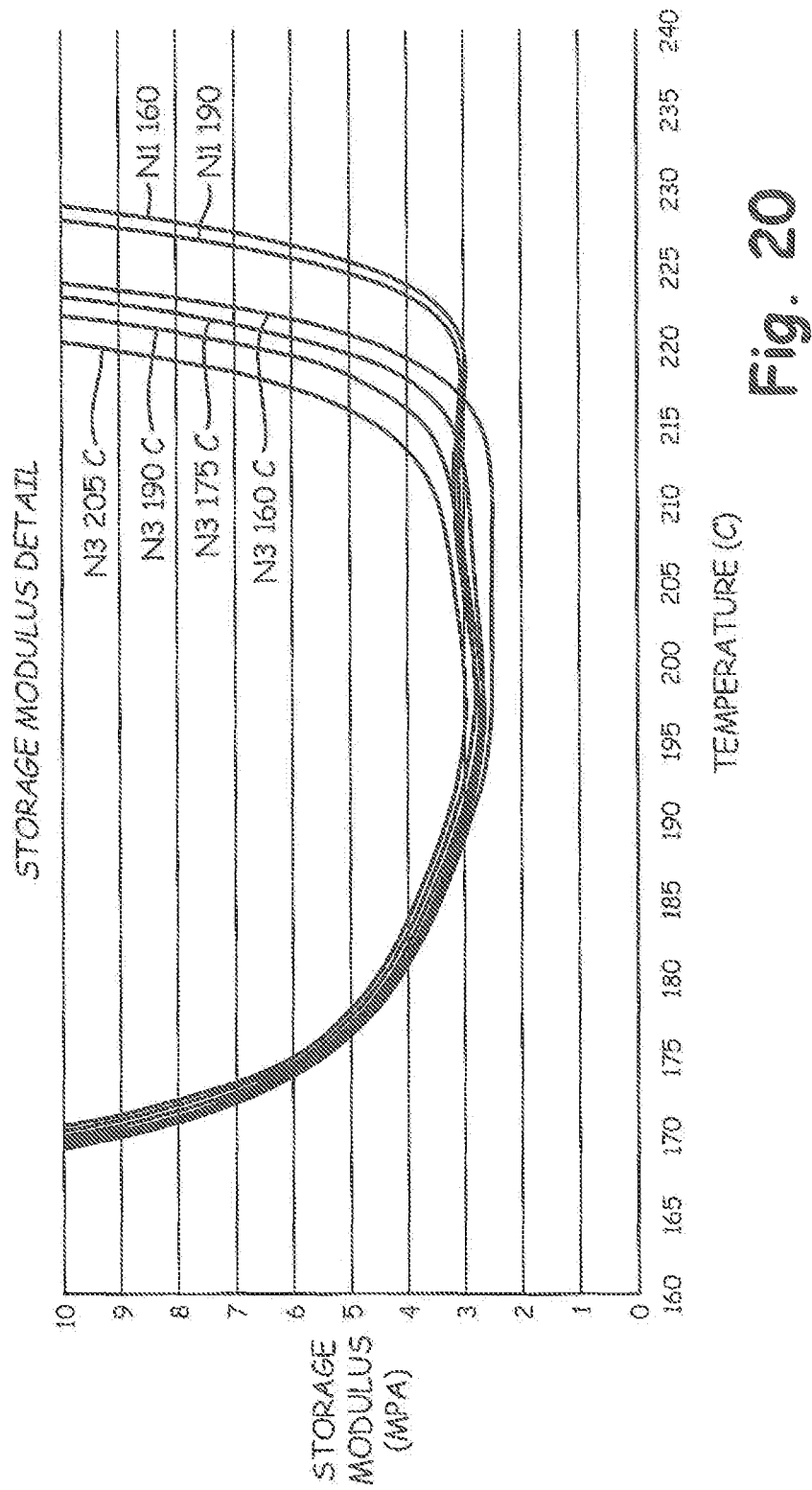
FIG. 20 is a graphical illustration of storage modulus versus temperature for several PEKK based build materials.

Referring to FIG. 20, dynamic mechanical analysis (DMA) of the formulations designated N1 and N3 in Table 5 provides evidence of enhanced crystallinity and crystallization rate through modulus development during when a temperature is increased over time. The data in FIG. 20 illustrates slight, and subtle differences between 1% and 5% PEEK alloys with Kepstan 6003 (N1 and N3). The data graphically illustrate that the 5% PEEK loading was more effective in increasing modulus at temperatures approaching and exceeding the $T_g$, which is important for FDM part construction and annealing. If the modulus of the part were only slightly above the $T_g$, excessive part warping and distortion would occur from annealing processes. The following data also graphically illustrates that increasing oven temperature (quench temperature) can subtly, but significantly affect the modulus of the printed parts, thus allowing them to be printed in an environment that is above the $T_g$ of the semi-crystalline polymer, but below the melting point.

Example 3

Example 3 relates to a copolyester build material that utilizes crystalline kinetics control to build items through additive manufacturing. A semicrystalline copolyester with a melting point of 240° C. was used along with a glycol modified amorphous PET (PETG) and an impact modifier. Exemplary materials used in Example 3 were SkyPET BR Clear, SK Chemical SkyGreen PETG both of which are manufactured by SK Chemicals located in Gyeonggi-do, South Korea, and DuPont Elvaloy® PTW.

The materials were compounded on a twin-screw extruder Model Number ZSE 18 mm lab compounder, manufactured by Leistritz Aktiengesellschaft located in Nuremberg, Germany extruder at 270° C. for a selected amount of time, quench cooled into water, and pelletized for further processing. In this example, only a single material was tested, a formulation consisting of 76% SkyPET, 19% SkyGREEN and 5% Elvaloy PTW.

Figure 21:
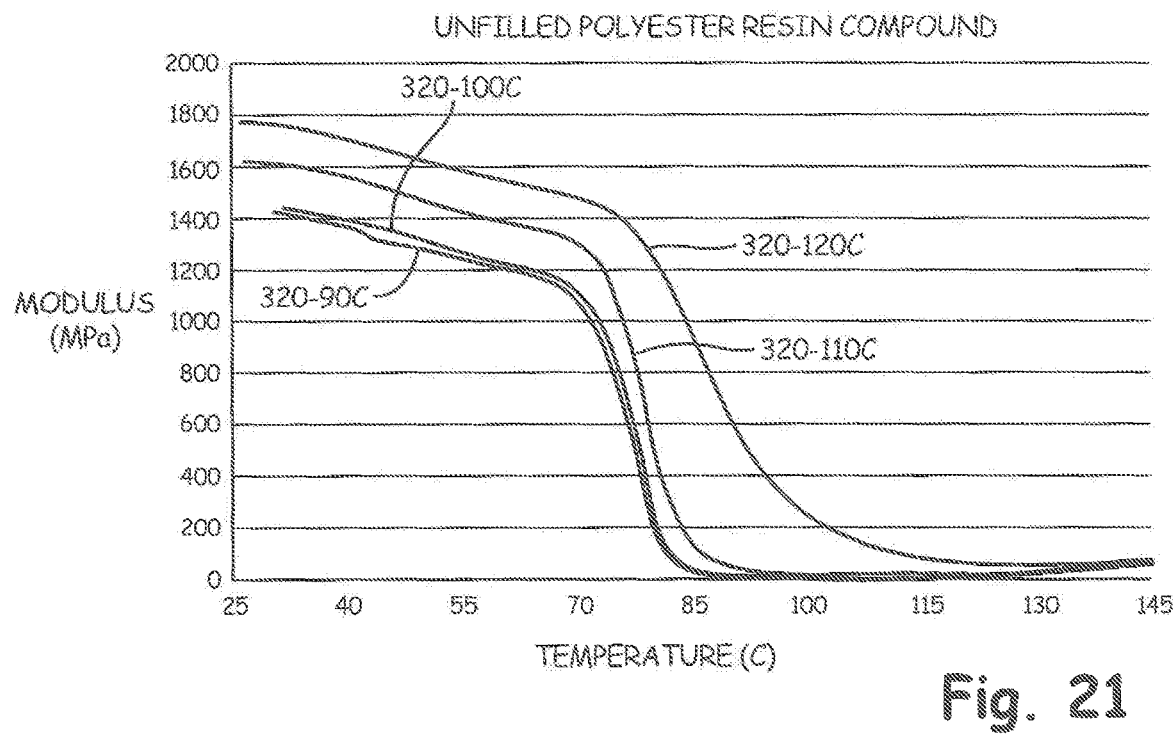
FIG. 21 is a graphical illustration of modulus versus temperature for exemplary PET build materials, illustrating crystallization effects of a post-printing crystallization process.
Figure 22:
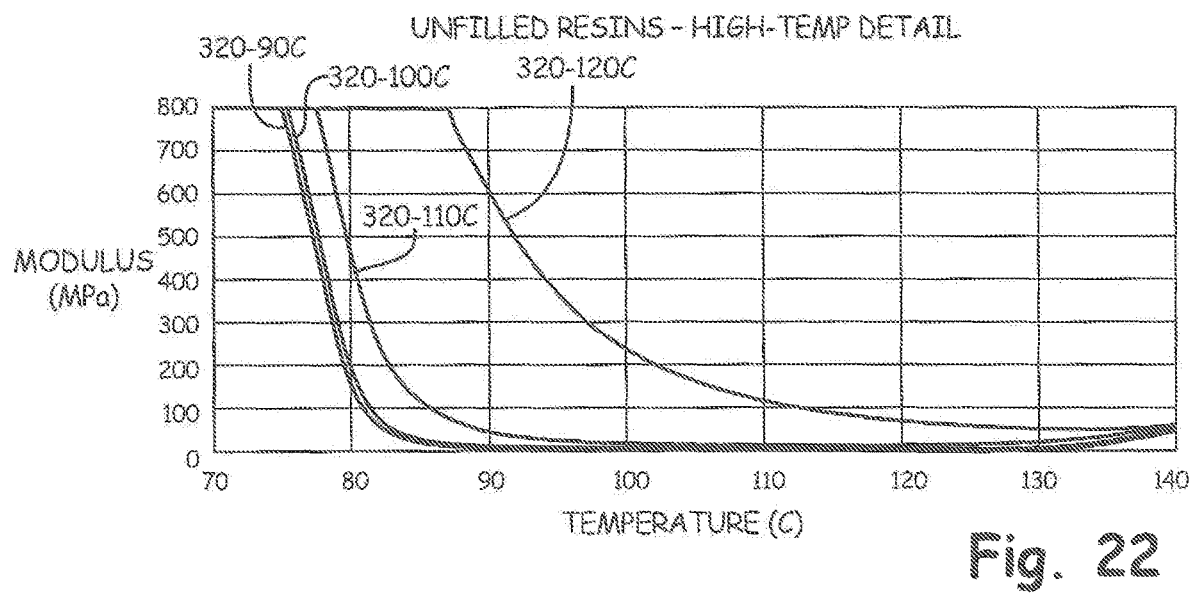
FIG. 22 is a graphical illustration of high temperature profile of FIG. 21 of modulus versus temperature for exemplary PET build materials, illustrating crystallization effects of a post-printing crystallization process.

Samples were printed on a FORTUS® 400MC machine at oven set-point temperatures from 90° C. to 120° C. in 10° C. increments. The liquefier set-point was 320° C., and the layer resolution was 10 mils. DMA testing of modulus vs. temperature were collected on 50 mm long samples printed at each temperature. The temperature was increased from about 30° C., to 150° C. This temperature range encompasses the full useful range of an unreinforced PET material, and captures the onset of additional crystallization (annealing). The results of the DMA testing are illustrated in FIGS. 21 and 22.

Next the formulations set forth in Table 7 as set forth below were compounded and tested.

TABLE 7

| Material | 1 | 2 | 3 |
|---|---|---|---|
| SkyPET BR Clear PET (wt. %) | 85.5 | 76 | 66.5 |
| Elvaloy PTW(wt. %) | 5 | 5 | 5 |
| Flat Glass, CSG-3pa-830 (wt. %) | | | |
| SkyGreen PETg (wt. %) | 9.5 | 19 | 28.5 |

Figure 23:
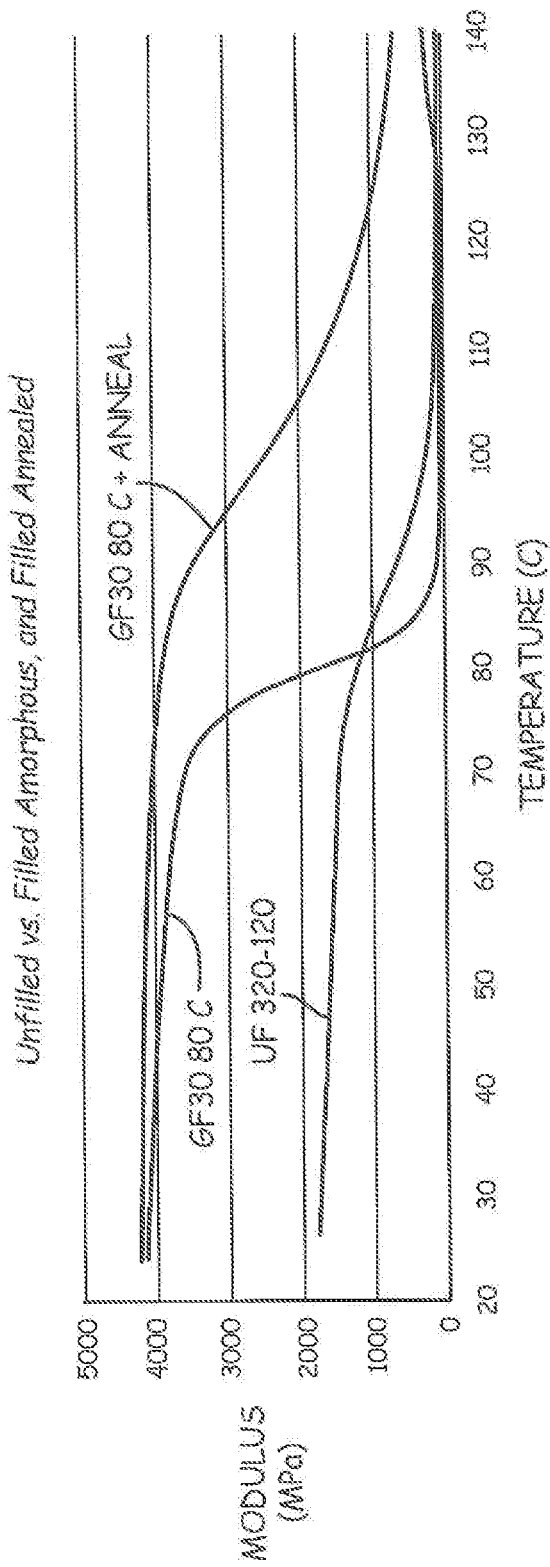
FIG. 23 is a graphical representation of modulus versus temperature for exemplary PET build materials, illustrating crystallization effects of a post-printing crystallization process

The second compound formation in Table 7 was subjected to similar DMA testing as disclosed above for the results in FIGS. 21 and 22. FIG. 23 illustrates that the modulus differences for the second formulation of Table 7 in a similar. The annealed sample was annealed for 4 hours in a separate oven at 145° C.

While the formulations of the semi-crystalline co-polyester in Table 7 range from 66.5 wt. % to 85.5 wt. % and the glycol modified amorphous PETG ranges from 9.5 wt. % to 28.5 wt. % in this example, the range of the semi-crystalline co-polyester can range from about 50 wt. % to about 99 wt. % and the PETG can range from about 1 wt. % to about 50 wt. %. More particularly, the range of the semi-crystalline co-polyester can range from about 55 wt. % to about 95 wt. % and the PETG can range from about 2 wt. % to about 45 wt. %. More particularly, the range of the semi crystallization polymer ranges from about 75 wt. % to about 85 wt. % and for PETG ranges from about 15 wt. % to about 25 wt. %. Whatever the formulation, any formulation that includes semi-crystalline co-polyester and PETG that has 2 J/g heat of fusion and about 80% of the heat of fusion of a semi-crystalline co-polyester that is compositionally about 100% of the semi-crystalline co-polyester, as measured by differential scanning calorimetry (DSC) as set forth herein falls within the scope of the present disclosure whether or not fillers, binders, impact modifiers, colorants or the like are added to the formulation.

Figure 24:
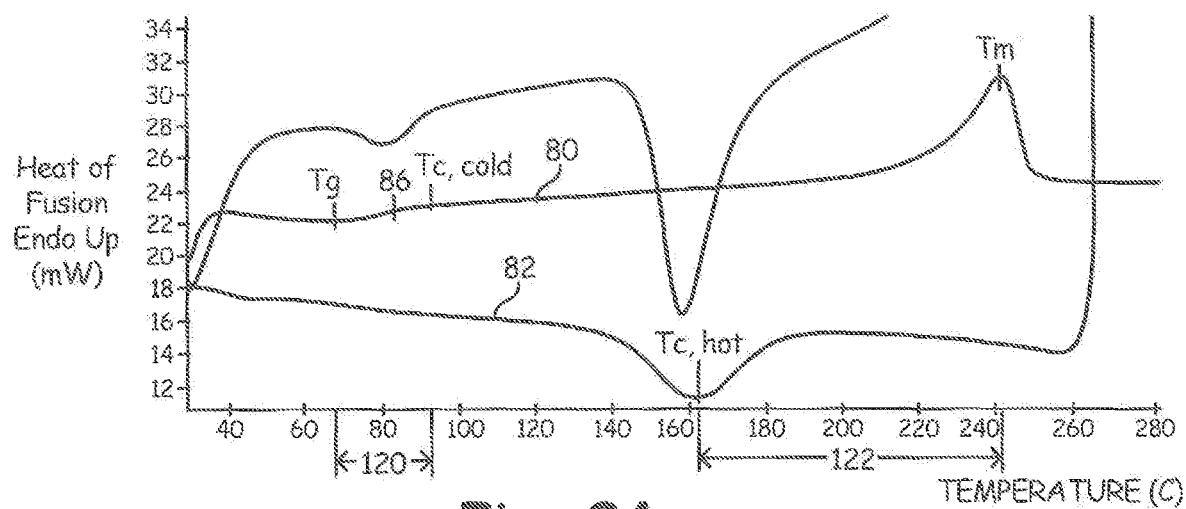
FIG. 24 is an illustrative DSC plot of heat flow versus temperature for a first polyester base material.
Figure 25:
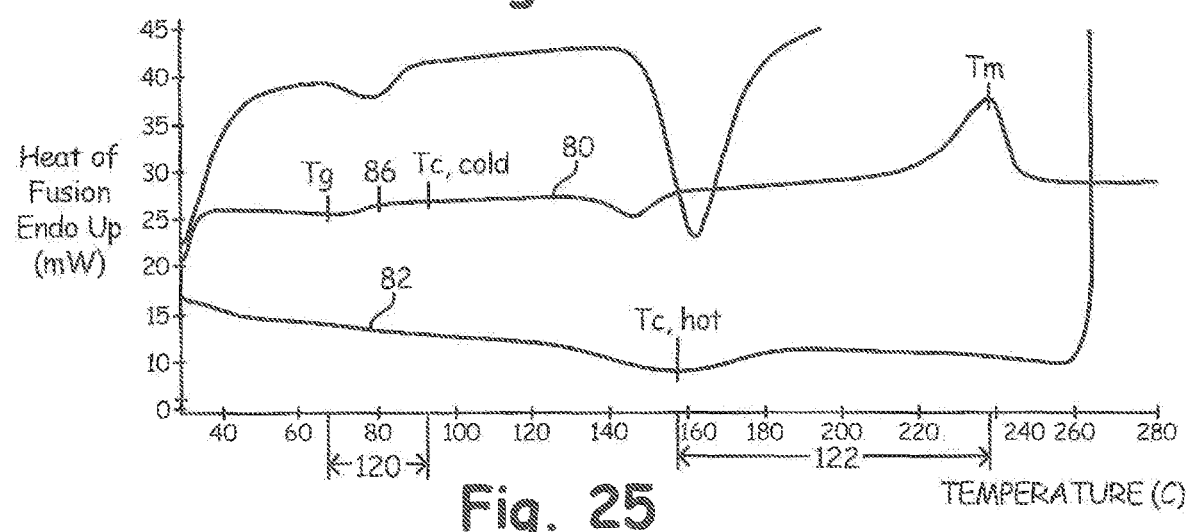
FIG. 25 is an illustrative DSC plot of heat flow versus temperature for a second polyester base material.
Figure 26:
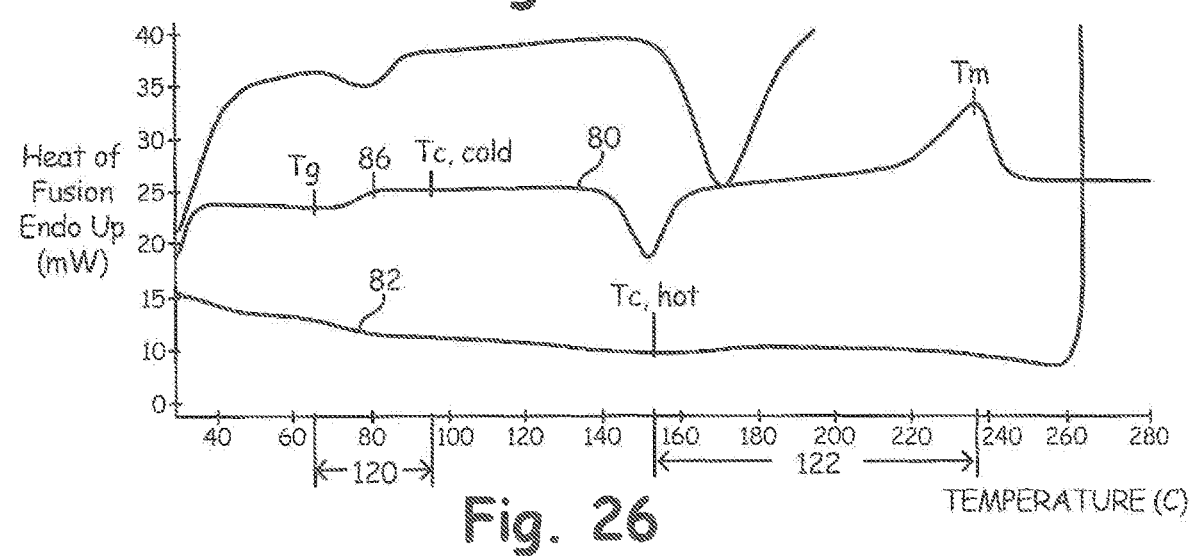
FIG. 26 is an illustrative DSC plot of heat flow versus temperature for a third polyester base material.

The compound formations disclosed in Table 7 were also subjected to DSC testing. FIGS. 24-26 illustrate DSC traces for compounds 1-3 of Table 7, respectively. The $T_g$, $T_{c,cold}$, $T_m$, $T_{c,hot}$ designations illustrate the changing process windows 120 and 122 for both extrusion based additive manufacturing and EP at 120 and for SLS an HSS additive manufacturing techniques at 122. The DSC scans were completed with unannealed pellets, heated at 30° C./min, and cooled at 10° C./min. Of note is the gradually decreasing, broadening, and low-temp shifted recrystallization (hot recrystallization) peaks in each of the formulations with increasing PETG content relative the base semi-crystalline co-polyester. This indicates that a larger processing window can be created when utilizing SLS and HSS additive manufacturing techniques.

As illustrated in the data and the associated FIGS. 24-26, the combination of the semi-crystalline co-polyester and the PET reduces the $T_g$ of the alloy. Interestingly, when using OOO additive manufacturing techniques, the printed item results in a lower residual stress. If the semi-crystalline co-polyester and the PET is annealed the heat deflection temperature (HDT) will be significantly increased, even if built in with an OOO additive manufacturing system provide a reinforcing material is added, such as carbon fiber.

Further, it is contemplated that an 80 wt. % semi-crystalline co-polyester and a 20 wt. % PET copolymer where the materials are virgin, if processed into a powder, could be used in SLS and HSS. The feed heater in an SLS application would be at about 146° C., the part bed heater would be at 210° C., the cylinder heater would be at about 140° C., the piston heater would be at about 169° C., the fill laser power would be about 67W with two bars and about 57W with one bar, the fill scan speed would be about 500 in/sec, the outline laser power would be about 14W. Under these process conditions, or similar conditions, a semi-crystalline product could be produced with an SLS device. Applicant submits that the same composition, if properly ground and including a heat absorbing material could be used to print a semi-crystalline item with an HSS device.

Figure 27:
FIG. 27 is an electron-microscope photograph of an item printed with polyamide under the trade designation PA 650 ng.
Figure 28:
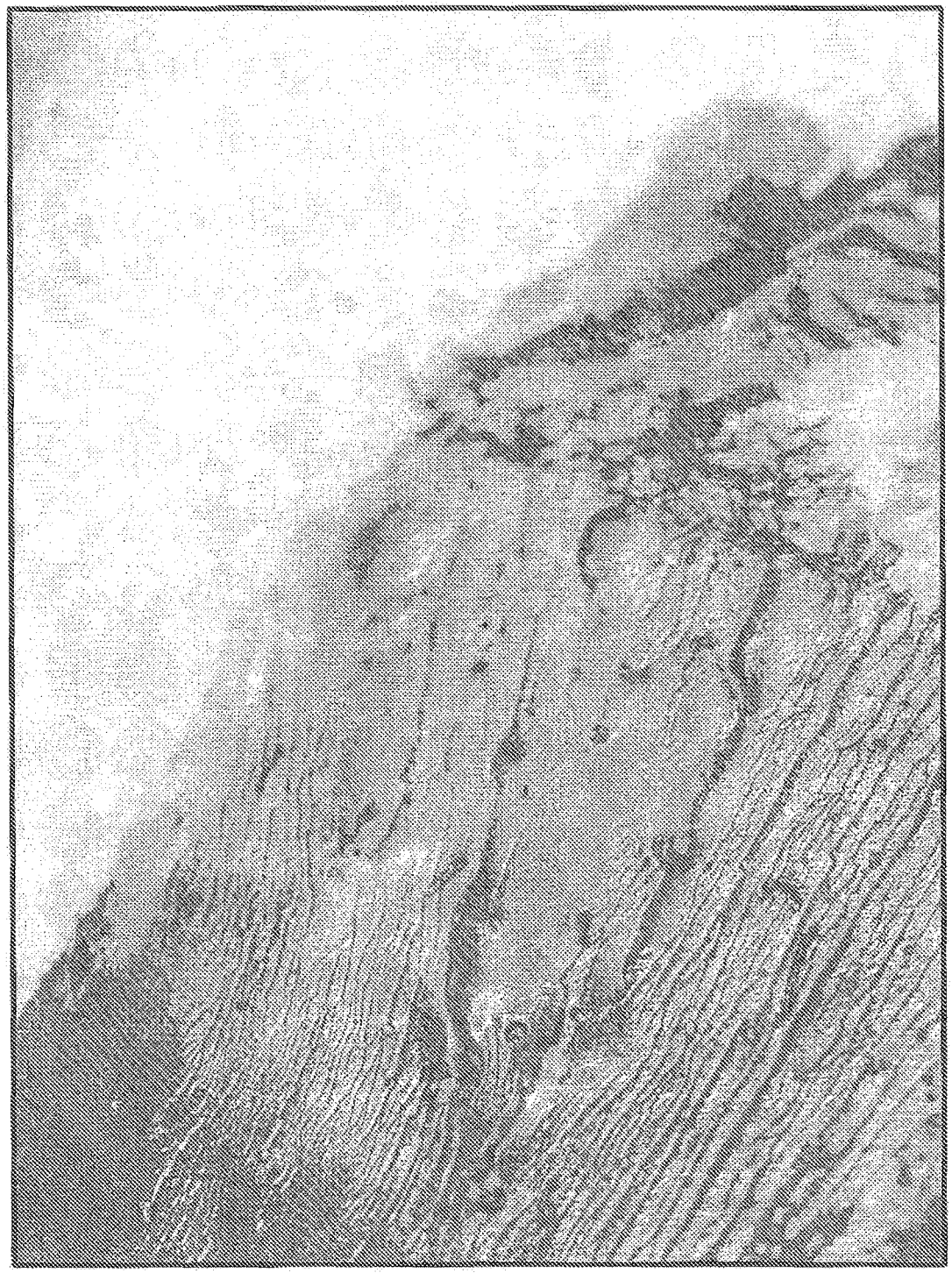
FIG. 28 is an electron-microscope photograph of an item printed with polyethylene terephthalate (PET).
Figure 29:
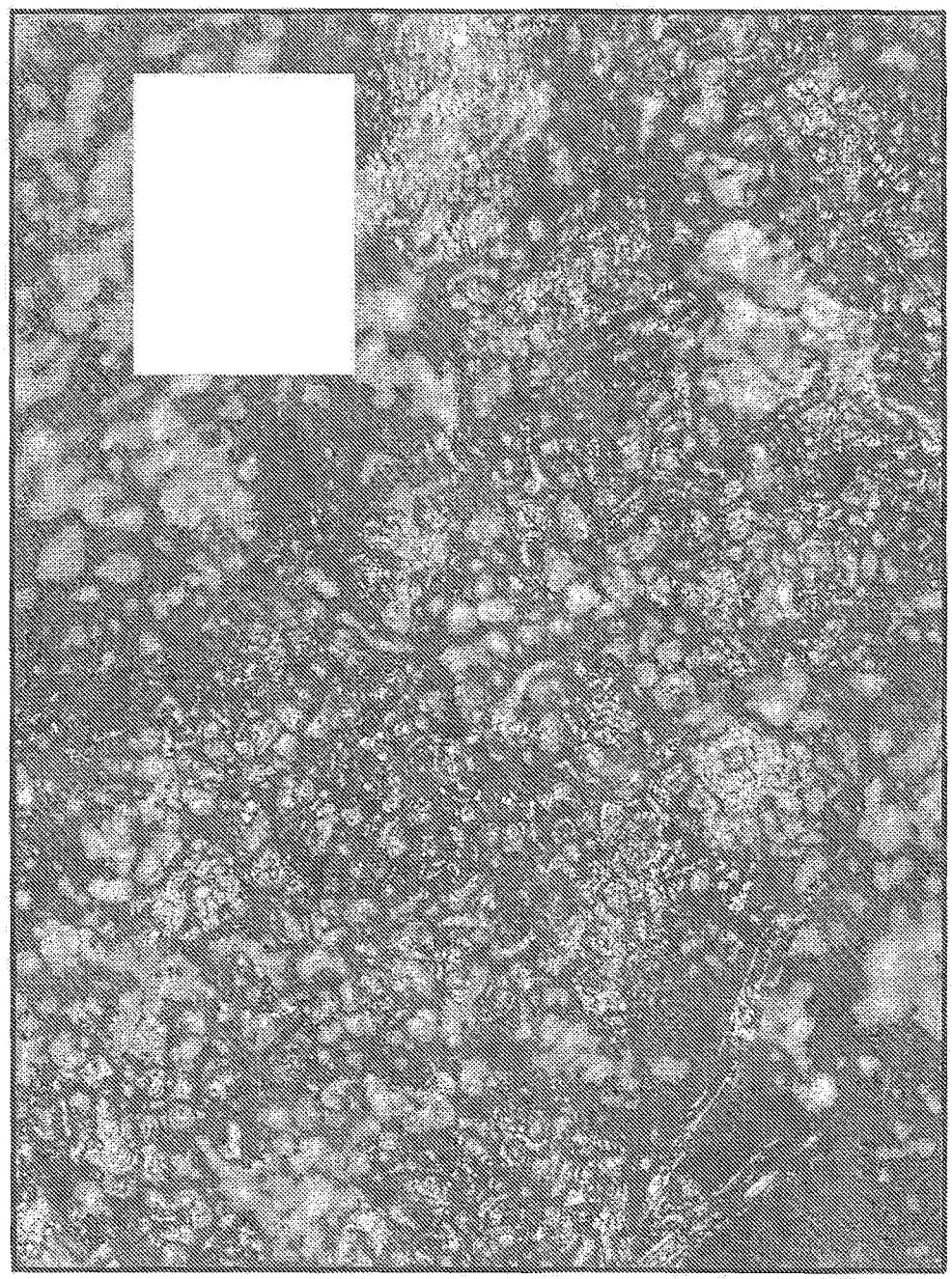
FIG. 29 is an electron-microscope photograph of an item printed with a copolymer of PA12 with TR90.

Referring to FIGS. 27-29, Video Enhanced Microscopic images taken with a Keyence Microsope illustrate fracture surface of items made with different materials utilizing the disclosed controlled crsytallization kinetics. FIG. 27 is a Video Enhanced Microscopic image of an item printed with polyamide under the trade designation PA 650 manufactured by Advanced Laser Systems, LLC located in Temple, Tex. FIG. 28 is a Video Enhanced Microscopic image of an item printed with polyethylene terephthalate (PET). FIG. 29 is Video Enhanced Microscopic image of an item printed with a copolymer of PA12 with TR90.

Due to the controlled crystallization kinetics, the material does not crystallize as fast, and the material is allowed to stay molten for longer. As such items printed with controlled crystallization kinetics are more dense, while maintaining feature definition.

While others may be able to achieve the densities achieved with the control crystallization kinetics, other processes will lose downward facing definition and aesthetics.

The present disclosure allows an SLS device to produce an item with isotropic properties and with feature detail. Currently SLS devices cannot print an item with isotropic properties and feature detail. Rather one is compromised for the other Due to the suppression of the hot crystallization temperature using the formulations set forth herein, the part bed can be maintained at lower temperatures, and have a higher gradient between the powder temperature and the lasered part, without worrying about feature growth. As such as illustrated in FIGS. 27-29, the present disclosure provides superior printed items relative to parts printed with semi-crystalline polymers without the secondary material.

Although the present disclosure has been described with reference to preferred embodiments, workers skilled in the art will recognize that changes may be made in form and detail without departing from the spirit and scope of the disclosure.

The invention claimed is:

1. A method of 3D printing a semi-crystalline part with a layer-wise sintering system, the method comprising:
    providing a part material in powder form for use in the sintering system, the part material comprising:
        a neat semi-crystalline polymer having a melt temperature and a hot crystallization temperature below the melt temperature; and
        a secondary material or materials selected from the group consisting of an amorphous polymer that is substantially miscible with the semi-crystalline polymer or an irregular monomer that breaks a regularity of repeating units in the semi-crystalline polymer;
    wherein when the secondary material or materials are combined with the neat semi-crystalline polymer to form a polymeric blend with substantially no change in the melt temperature and at least a 3° C. reduction in the hot crystallization temperature relative to the neat semi-crystalline polymer, such that an operating window between the melt temperature and the hot crystallization temperature is increased by at least 3° C.;
    forming a layer of the part material provided in powder form;
    sintering at least a portion of the layer of part material provided in powder form to construct a bonded part layer; and
    repeating the forming and sintering steps in successive layers to form a series of bonded part layers forming the part;
    wherein the series of bonded part layers are maintained within the operating window while the part is being printed.

2. The method of claim 1, wherein the polymeric blend has at least a 5° C. reduction in the hot crystallization temperature relative to the neat semi-crystalline polymer, such that the operating window is increased by at least 5° C.

3. The method of claim 1, wherein the polymeric blend has at least a 10° C. reduction in the hot crystallization temperature relative to the neat semi-crystalline polymer, such that the operating window is increased by at least 10° C.

4. The method of claim 1, wherein the secondary material or materials comprises the amorphous polymer that is substantially miscible with the semi-crystalline polymer.

5. The method of claim 1, wherein the secondary material or materials comprises the irregular monomer that breaks-up the regularity of repeating units, hindering the formation of crystallites in the part material.

6. The method of claim 1, wherein the neat semi-crystalline polymer primarily comprises a material selected from the group consisting of one or more semi-crystalline polyesters, one or more semi-crystalline polyamides, one or more polycarbonates, and one or more polyaryletherketones (PAEK).

7. The method of claim 1, wherein the semi-crystalline material comprises one or more semi-crystalline polyesters and wherein the secondary material comprises glycol modified polyethylene terephthalates.

8. The method of claim 7, wherein the one or more semi-crystalline polyesters comprises between about 50 wt. % and about 99 wt. % and the glycol modified polyethylene terephthalates comprises between about 1 wt. % and about 50 wt. % of the part material.

9. The method of claim 7, wherein the one or more semi-crystalline polyesters comprises between about 75 wt. % and about 85 wt. % and the glycol modified polyethylene terephthalates comprises between about 15 wt. % and about 25 wt. % of the part material.

10. The method of claim 7, and wherein the part material further comprises a reinforcing material, wherein the reinforcing material comprises between about 10 wt. % and about 50 wt. % of the part material.

11. The method of claim 1, wherein the semi-crystalline polymer comprises polyhexamethyleneaidpamide and the secondary material comprises polyamides of trimethylhexamethylenediamine and terephthalic acid.

12. The method of claim 11, wherein the polyhexamethyleneaidpamide comprises between about 30 wt. % and about 75 wt. % and wherein the polyamides of trimethylhexamethylenediamine and terephthalic acid comprises between about 25 wt. % and about 70 wt. % of the part material.

13. The method of claim 11, wherein the polyhexamethyleneaidpamide comprises between about 30 wt. % and about 60 wt. % and the secondary material comprises polyamides of trimethylhexamethylenediamine and terephthalic acid comprising between about 40 wt. % and about 50 wt. % of the part material.

14. The method of claim 11, and wherein providing the part material further comprises providing a reinforcing material, and wherein the ratio of the polyhexamethyleneaidpamide to the polyamides of trimethylhexamethylenediamine and terephthalic acid is in the range of 2:1 and 4:1 and the reinforcing material comprises between about 10 wt. % and about 50 wt. % of the part material.

15. The method of claim 1, wherein the semi-crystalline polymer comprises polyhexamethylenesebacamide and the secondary material comprises 2,4,4 trimethyl diacid.

16. The method of claim 1, and wherein the part material further comprises reinforcing agents or fillers.

17. A method of printing a semi-crystalline part with a layer-wise sintering system, the method comprising:
providing a part material in powder form for use in the sintering system, the part material comprising:
a neat semi-crystalline polyester having a melt temperature and a hot crystallization temperature below the melt temperature; and
amorphous polyethylene terephthalate;
wherein when the amorphous polyethylene terephthalate is combined with the neat semi-crystalline polyesters to form a polymeric blend with substantially no change in the melt temperature and at least a 3° C. reduction in a hot crystallization temperature relative to the neat semi-crystalline polyester, such that an operating window between the melt temperature and the hot crystallization temperature is increased by at least 3° C.;
forming a layer of the part material provided in powder form
sintering at least a portion of the layer of part material provided in powder form to construct a bonded layer; and
repeating the forming and sintering steps in successive layers to form a series of bonded part layers forming the part;
wherein the series of bonded part layers are maintained within the operating window while the part is being printed.

18. The method of claim 17, wherein the neat semi-crystalline polyester comprises one or more semi-crystalline polyesters and the amorphous polyethylene terephthalate comprises one or more amorphous polyethylene terephthalates.

19. The method of claim 17, wherein the neat semi-crystalline polyester comprises between about 50 wt. % and about 99 wt. % and the amorphous polyethylene terephthalate comprises between about 1 wt. % and about 50 wt. % of the part material.

20. The method of claim 17, wherein the neat semi-crystalline polyester comprises between about 75 wt. % and about 85 wt. % and the amorphous polyethylene terephthalate comprises between about 15 wt. % and about 25 wt. % of the part material.

21. The method of claim 17, and wherein the part material further comprises a reinforcing material, wherein the reinforcing material comprises between about 10 wt. % and about 50 wt. % of the part material.

* * * * *